United States Patent [19]

Ito

[11] 4,085,641
[45] Apr. 25, 1978

[54] FLYING SHEAR MACHINE FOR CUTTING TRAVELING STOCK

[75] Inventor: Kunihiro Ito, Kobe, Japan

[73] Assignee: Kawasaki Jukogyo Kabushiki Kaisha, Kobe, Japan

[21] Appl. No.: 755,611

[22] Filed: Dec. 29, 1976

[30] Foreign Application Priority Data

Dec. 30, 1975 Japan .............................. 50-158747
Dec. 30, 1975 Japan .............................. 50-158748
Dec. 30, 1975 Japan .............................. 50-158749

[51] Int. Cl.² ........................................... B26D 1/56
[52] U.S. Cl. .................................................. 83/328
[58] Field of Search ................. 83/316, 317, 318, 320, 83/328

[56] References Cited

U.S. PATENT DOCUMENTS 3,264,920  8/1966  Hallden ........................... 83/328 X
3,921,484 11/1975  Rasenberger ..................... 83/320
3,922,939 12/1975  Schlueter et al. ................. 83/328 X

*Primary Examiner*—Willie G. Abercrombie
*Attorney, Agent, or Firm*—Haseltine, Lake & Waters

[57] ABSTRACT

A pair of shifting supports for supporting a shiftable shear housing in a flying shear machine for cutting traveling stock comprises a parallel crank mechanism which, together with a crank mechanism of a pair of shearing drives, is incorporated in a motive power transmission mechanism provided on a base and driven, together with a pair of shifting drives, by a common driving power source, the cranks of the parallel crank mechanism rotating one or two revolutions per revolution of a main shaft for shifting drive of the pair of shifting drives, a movement approximating a straight-line motion along the travel direction of the stock being imparted to the shiftable shear housing in at least a shearing interval of the forward stroke of the reciprocating movement thereof caused by the pair of shifting drives.

5 Claims, 36 Drawing Figures

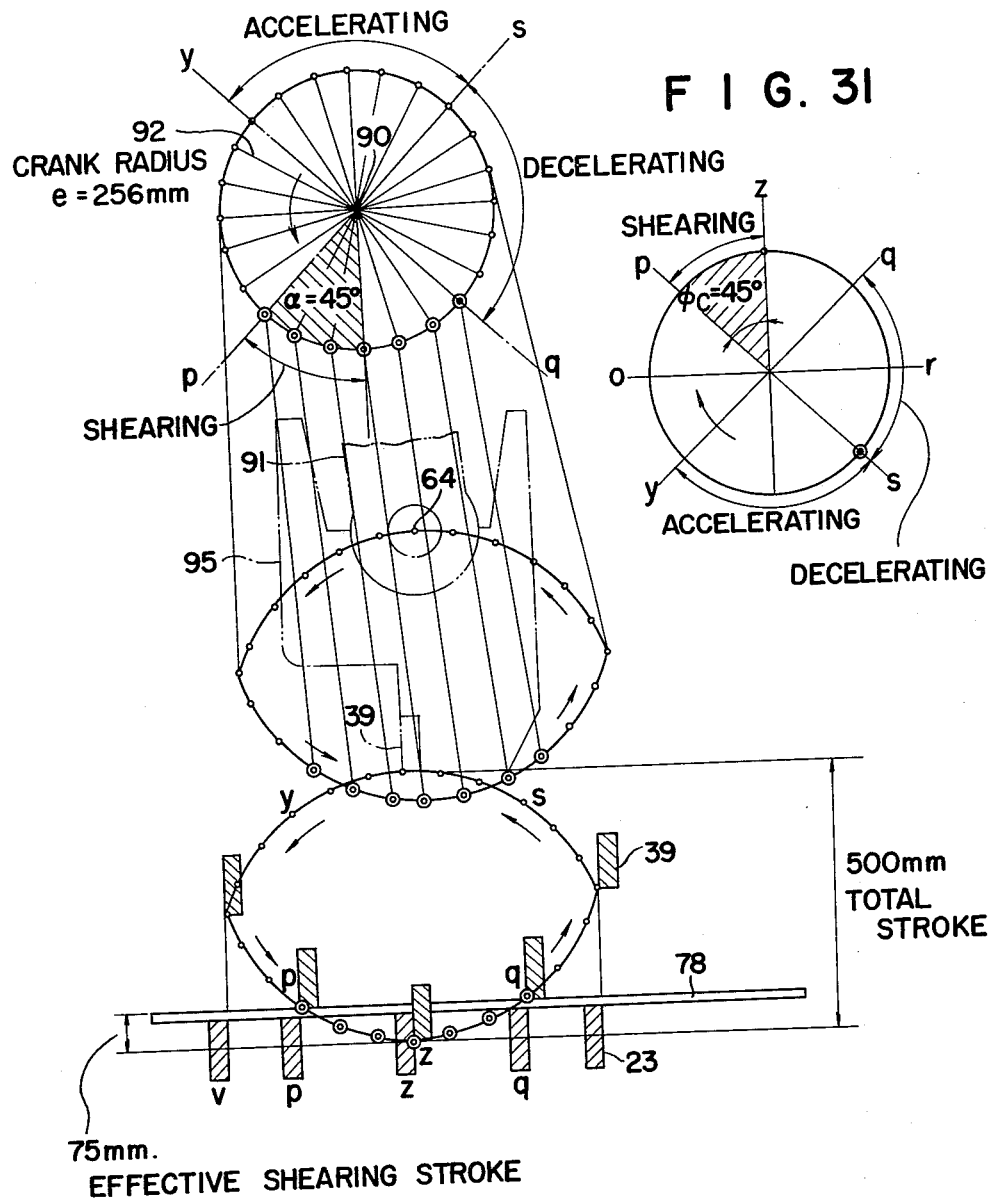

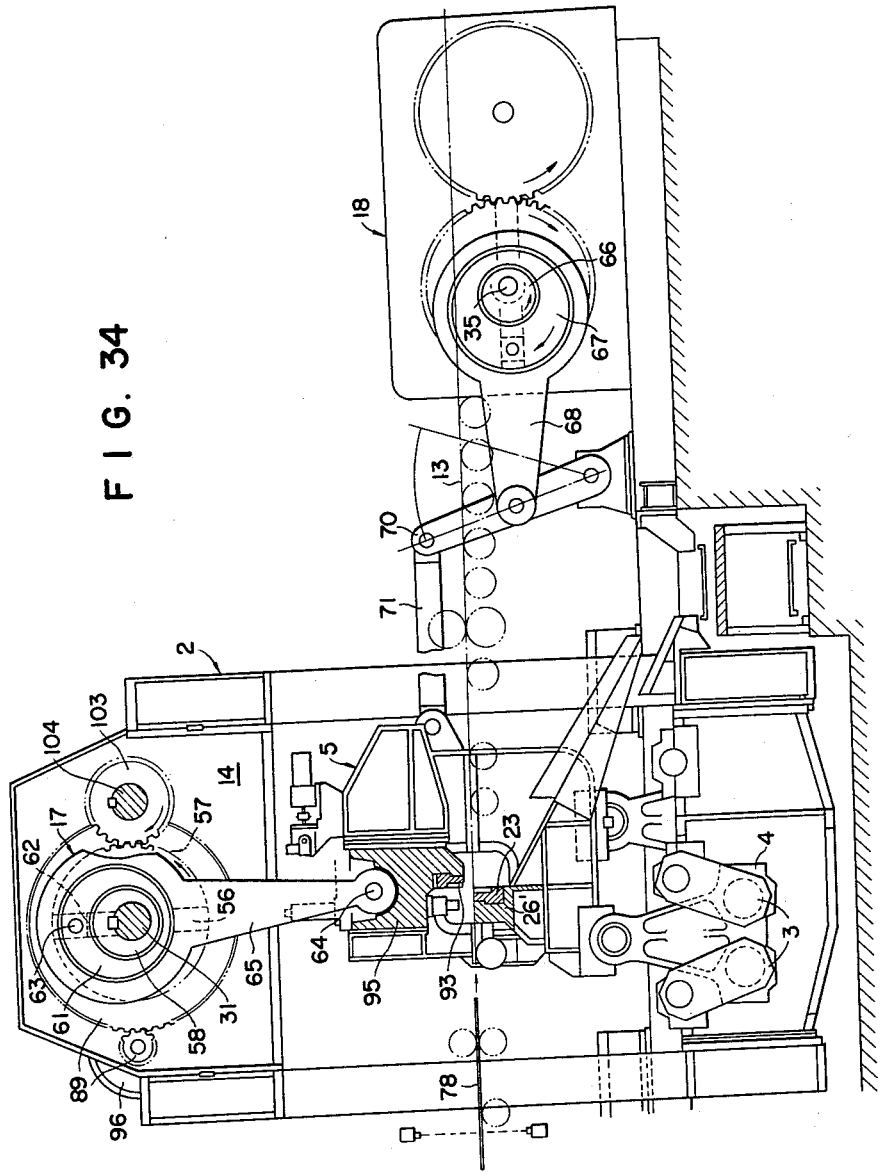

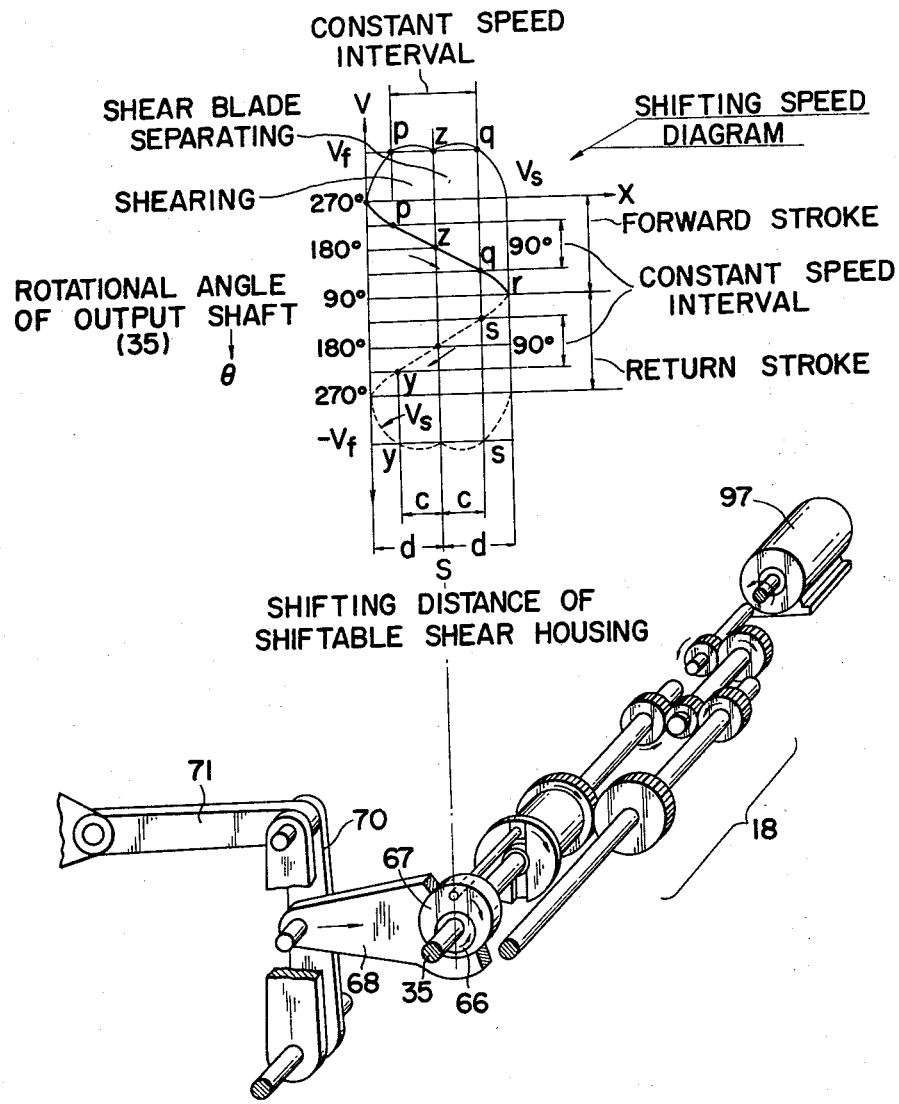

FLYING SHEAR MACHINE FOR CUTTING TRAVELING STOCK

BACKGROUND OF THE INVENTION

This invention relates generally to stock cutting means in metal producing plants and more particularly to a flying shear machine (or flying shears) for cutting hot-rolled steel strip in traveling state into sections of equal length or different lengths.

Flying shears heretofore installed in equipment for producing heavy gage plate from hot-rolled strip may be broadly divided into pendulum or rocker type shears and flying press type or so-called die-cut type shears. In pendulum or rocker type shears, opposed upper and lower shear blades both undergo reciprocating motion as they rotate about a center at the instant of swinging or rocking. For this reason, at the time of shearing, the angles of the upper and lower shear blades relative to the stock material vary continually with time.

In contrast, in a flying press type or so-called die-cut type shears, the opposed upper and lower shear blades undergo reciprocating movements in the vertical direction and the horizontal direction, and the angles of the upper and lower shear blades relative to the stock material do not vary, and, accordingly, perpendicularity of the plate cut surface is readily obtained. For this reason, flying press type shears are used almost exclusively in equipment for producing heavy gage plates such as those of 6 mm. or more, or 9 mm. or more in thickness.

This flying press type or so-called die-cut shear machine has a shiftable shear housing supported by a supporting device, examples of which are a device of a type which supports the shiftable shear housing on a slide surface or by means of wheels or cylindrical rollers, a device comprising a parallel link mechanism 1 as shown in FIG. 1, and a device which supports a shiftable shear housing 5 (as shown in FIG. 2 of the accompanying drawings briefly described hereinafter) by means of a mechanism approximating straight-line motion, called a Robert's mechanism, comprising a pair of links 3 and Tee-type link 4 connected to a housing 2.

In the supporting device which supports the shiftable shear housing on a sliding surface, however, it is difficult to obtain suitable lubrication of the slide surface, and, furthermore, as a consequence of biting in of scale and other abrasive material, the slide surface is readily damaged and subject to abnormal wear, seizure, and other impairment. In the supporting device employing wheels or cylindrical rollers, uneven wear due to offset contact and slippage relative to rails caused by off-center loading of the wheels or the cylindrical rollers readily arises.

In a parallel link mechanism 1 as illustrated in FIG. 1, pivoted connections 8 of a shear blade supporting beam 6 and pendulum arms 7 undergo arcuate motions, and a vertical movement of a degree which is more than necessary is imparted to the shear blade supporting beam 6. As a result, a vibrational load in the vertical direction due to the inertial mass of the shear blade supporting beam 6 acts on the frame 9, and noise is caused by the vertical vibration applied to the frame 9 and, in turn, to the shear machine base.

Furthermore, since the pendulum arms 7 swing through an angle of the order of 40° at the most, it becomes difficult to form oil films for lubrication of the pivoted connections 8 in the case of high loads. In addition, since the shifting drive mechanism 10 for the reciprocating shear blade supporting beam functions also as a parallel crank mechanism 11, the period of velocity synchronization between the stock material and the shear blade supporting beams 6 and 12 at the time of shearing is short, being only instantaneous, problems arise in the flying shearing of heavy gage steel plates exceeding 6 or 9 mm. in thickness, which require relatively long velocity synchronization distances.

On this point, the shiftable shear housing supporting device shown in FIG. 2 is free of problems such as biting in of scale and other matter and uneven contact, and a movement approximating a straight-line movement is imparted to the shiftable shear housing 5, whereby the above described difficulties due to arcuate motion are eliminated. On the other hand, since a wide space is required for the installation of this device, the flying shear machine, disadvantageously, must be made large in bulk merely for the purpose of this installation in the case of a flying shear machine or relatively narrow machine width such as that used in equipment for producing heavy gage steel plate from hot-rolled strip.

SUMMARY OF THE INVENTION

Accordingly, it is an object of this invention to provide a flying shear machine in which the above described difficulties accompanying the prior art are overcome by the adoption of parallel crank mechanisms, which require small installation area, in the device for supporting the shiftable shear housing thereby to impart a movement approximating a straight-line movement to the shiftable shear housing at least in the forward stroke of its forward-return reciprocation.

Another object of the invention is to simplify the construction of the flying shear machine and to reduce the volumetric size and weight thereof by coupling these parallel crank mechanism and crank mechanisms of the shearing drive device to a motive power transmission mechanism provided on the machine base and connecting the motive power transmission mechanism and the shifting drive device for the shiftable shear housing to a common driving power source thereby to install all driving mechanisms of the flying shear machine compactly on the base.

Still another object of the invention is to provide an economical flying shear machine in which crank mechanisms having inner and outer eccentric cams are employed in the shearing drive mechanism thereby to reduce the size of the shiftable shear housing and, at the same time, to hold to a minimum the rapid increase in required shearing power accompanying a speedup of the feed of the stock.

The nature, utility, and further features of this invention will be more clearly apparent from the following detailed description with respect to preferred embodiments of the invention when read in conjunction with the accompanying drawings, in which like parts are designated by like reference numerals.

BRIEF DESCRIPTION OF THE DRAWINGS

In the drawings, briefly described:

FIG. 31 is a rotational angle diagram of the inner eccentric cam shaft of the shifting drive device of the known machine illustrated in FIG. 2;

FIG. 32 is a combination of a rotational angle diagram of the eccentric cam shaft of the shearing drive device of the known machine illustrated in FIG. 2 and a diagram indicating the path of motion of a liftable shear blade when the eccentric cam shaft is driven at the same time and at the same rotational speed as the inner eccentric cam shaft of the shifting drive device;

FIG. 34 is a side elevation showing one embodiment of this invention; and

FIG. 35a and 35b are a combination of a schematic perspective view showing the driving system of the example illustrated in FIG. 34 and an operation diagram thereof.

DETAILED DESCRIPTION OF THE INVENTION

Figure 3:
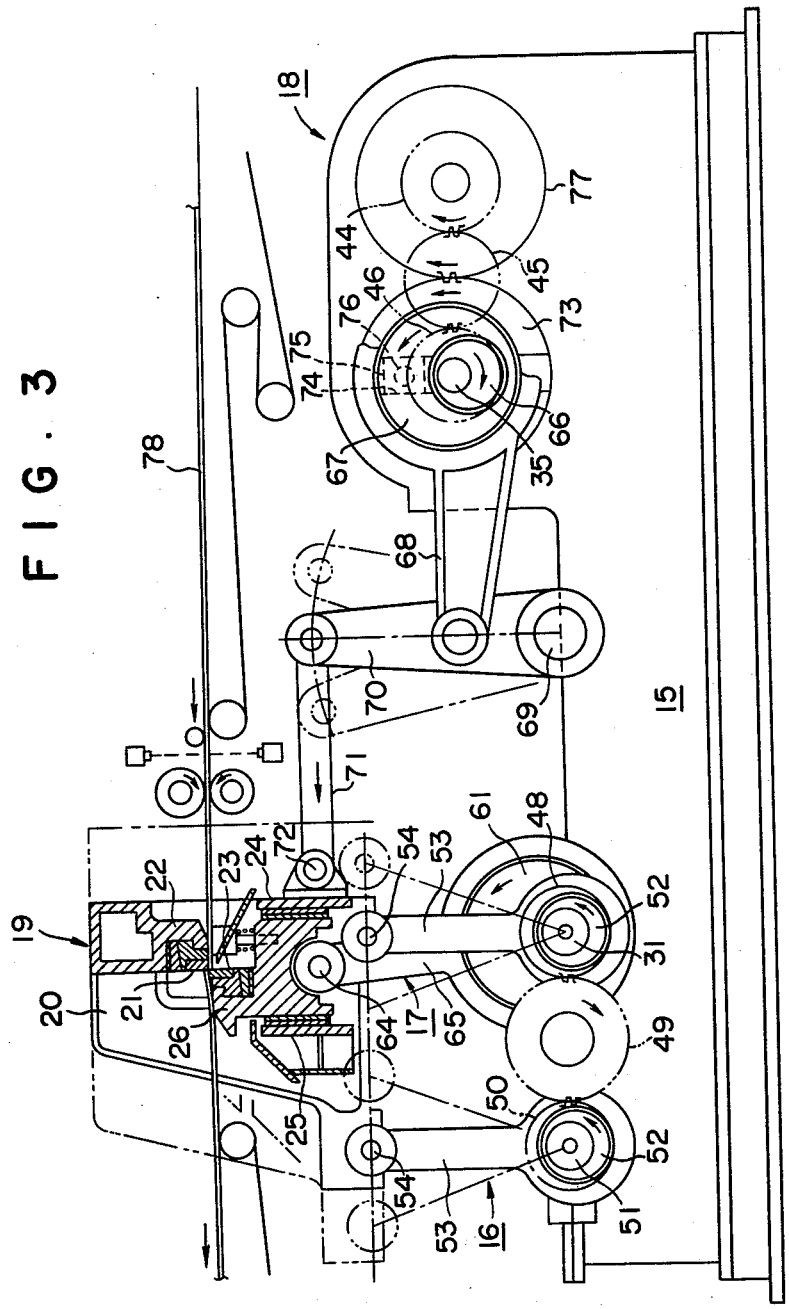
FIG. 3 is a side elevation showing the essential construction of a flying shear machine constituting a first idiment of the invention.
Figure 4:
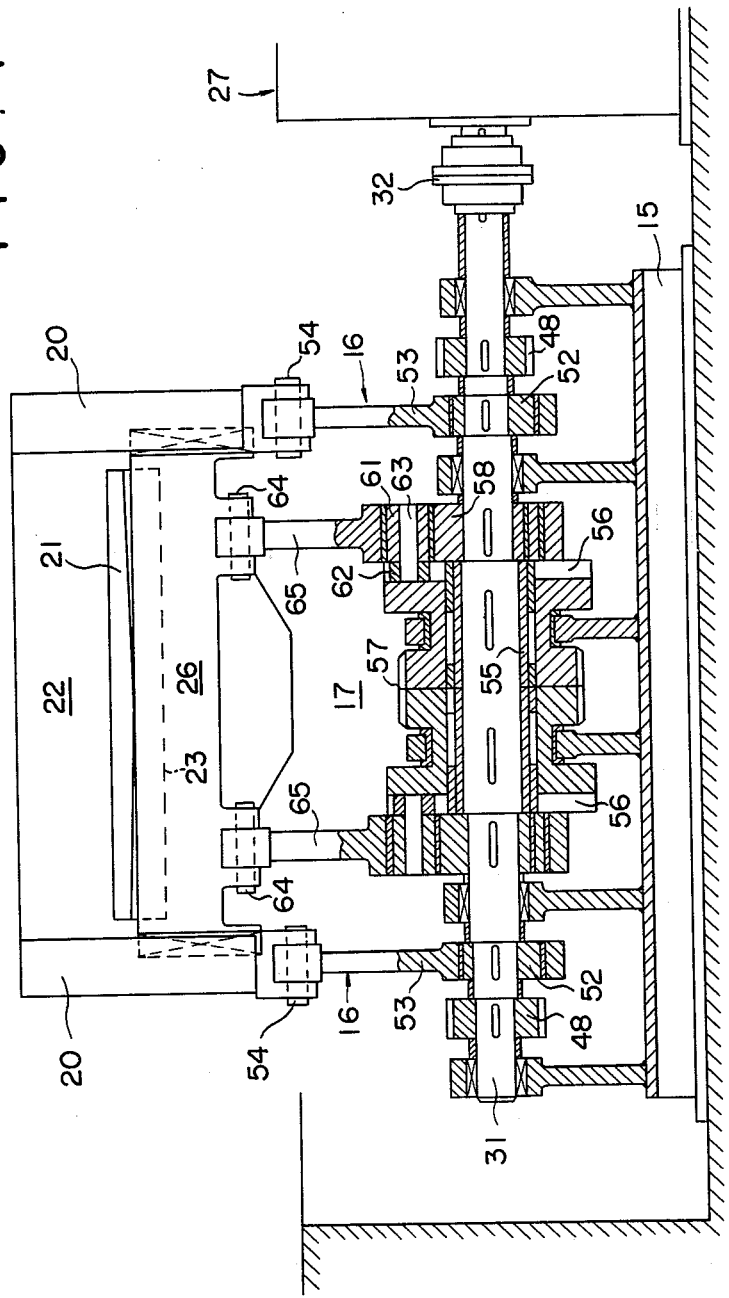
FIG. 4 is an end elevation, with parts cut away and parts in vertical section, of the same machine shown in FIG. 3.
Figure 5:
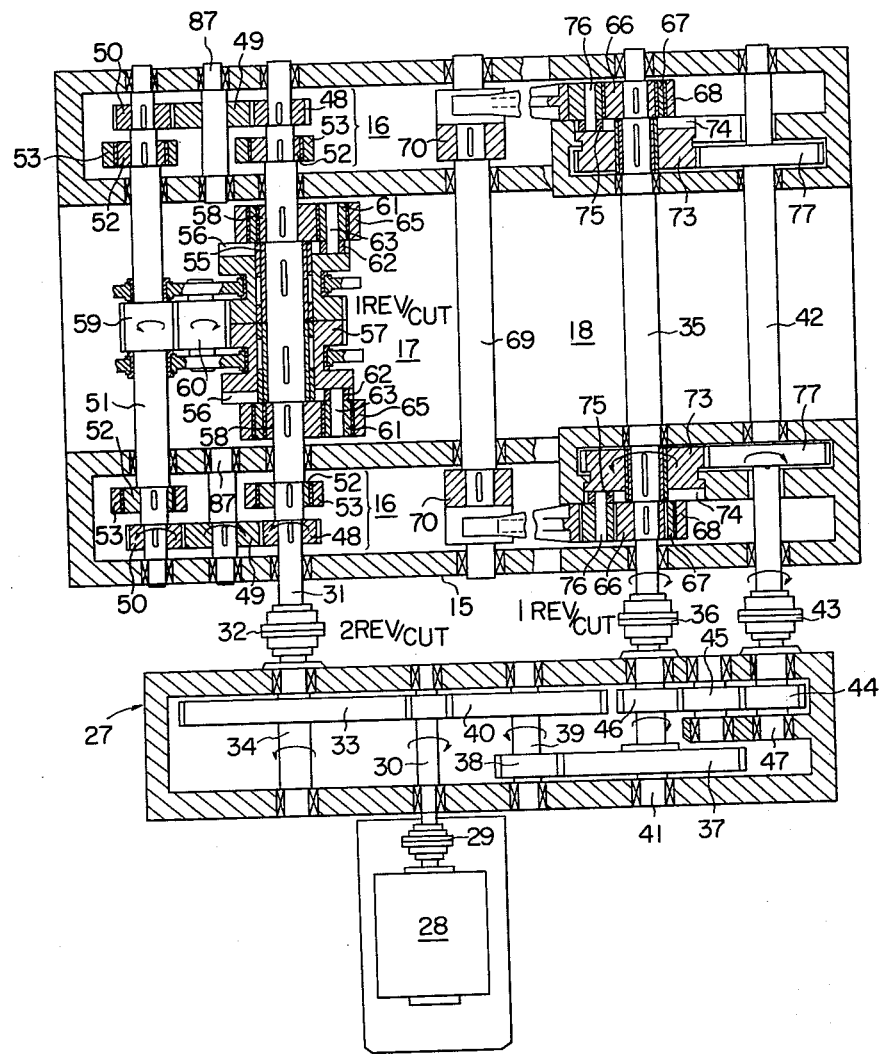
FIG. 5 is a plan view showing the driving system of the same machine shown in FIG. 3.

In a first embodiment of this invention as illustrated in FIGS. 3, 4, and 5, the flying shear machine comprises a pair of shifting supports 16 for supporting a shiftable shear housing 19, a pair of shearing drives 17 for lifting and lowering a liftable knife holder to effect a shear action between this knife holder and the opposite knife holder carried by the shiftable shear housing, and a pair of shifting drives 18 for reciprocating the shiftable shear housing in synchronism with a traveling stock 78 at the time of cutting, these supports 16, shearing drive pairs 17 and shifting drive pairs 18 being mounted on a base from 15.

The shiftable shear housing 19, which moves parallelly to the traveling stock 78, has an upper knife holder 22 fixed to left and right frames 20, 20 and provided at the lower part thereof with an upper shear blade 21 imbeddedly secured thereto and a lower knife holder 26 which is provided with a lower shear balde 23 imbeddedly secured thereto at a position to confront the upper shear blade 21 and is guided in vertical movement by a front guide 24 and a back guide 25. The shiftable shear housing 19 is supported in a manner permitting its reciprocating motion in the traveling direction of the stock 78 by the shifting supports 16 and is thus reciprocated by the shifting drives 18, and the lower knife holder 26 is driven in vertical movement by the shearing drives 17.

The shifting supports 16, the shearing drives 17, and the shifting drives 18 are coupled through a gear unit 27 to a motor 28. The gear unit 27 rotatably supports with bearings a pinion shaft 30 coupled to the motor 28 by way of a coupling 29, a first driving shaft 34 coupled by way of a coupling 32 to a main shaft 31 for shearing drive, which is an inner eccentric cam shaft for a liftable knife holder drive device, the first driving shaft 34 fixedly supporting a gear 33 meshed with the pinion shaft 30, a counter shaft 39 fixedly supporting a gear 38 and a gear 40 meshed with pinion shaft 30, a second driving shaft 41 coupled by way of a coupling 36 to a main shaft 35 for shifting drive, which is an inner eccentric cam shaft for the shiftable shear housing reciprocating flying drive device, the second driving shaft 41 fixedly supporting a gear 37 meshed with the gear 38, and a fourth driving shaft 47 which is coupled by way of a coupling 43 to a third driving shaft 42 disposed parallelly to the main shaft 35 for shifting drive and is coupled through gears 44, 45, and 46 (wherein gears 44 and 46 have the same pitch diameter) to the second driving shaft 41.

The above mentioned main shaft 31 for shearing drive serves additionally as the main shaft of the shifting supports 16 and is coupled at each of its ends through gears 48 and 49, a counter shaft 87, and a gear 50 (wherein the gears 48 and 50 have the same pitch diameter) to a corresponding end of a fifth driving shaft 51 rotatably supported and disposed parallelly to the main shaft 31. Near the two ends of this fifth driving shaft 51 and near the two ends of the main shaft 31, four circular eccentric cams 52 of equal eccentricities are respectively fixed to their respective shafts all with the same angular phase. Four straps 53 of equal length are fitted rotatably at their lower ends around respective eccentric cams 52 and are connected at their upper ends by pins 54 to the lower part of the shiftable shear housing 19 in a manner enabling these four straps 53 to swing parallelly. Thus, these eccentric cams 52 and straps 53 constitute a pair of parallel crank mechanisms.

In the pair of shearing drives 17, a gear 57 having radial slots 56 formed therein at its two end faces is rotatably fitted on the main shaft 31 for shearing drive at its middle part over a sleeve 55. Circular inner eccentric cams 58 of equal eccentricities are respectively fixed to the main shaft 31 on opposite sides of the gear 57. The gear 57 is meshed with an idler gear 60, which is meshed with a gear 59 fixed to the fifth driving shaft 51. Around the outer peripheries of the inner eccentric cams 58, circular outer eccentric cams 61 of equal eccentricity are respectively fitted and are coupled by pins 63 to respective sliding blocks 62 slidably fitted in respective radial slots 56. Around the outer peripheries of these outer eccentric cams 61 are fitted the lower ends of straps 65 respectively connected by pins 64 to the lower lateral parts of the lower knife holder 26 and functioning to transmit the combined resultant movement of the inner and outer eccentric cams 58 and 61 to the lower knife holder 26.

In the pair of shifting drives 18, two circular inner eccentric cams 66 of equal eccentricity are respectively fixed to the main shaft 35 for shifting drive near the two ends thereof, and in contact respectively therewith, gears 73 having radial slots 74 formed in their side faces are rotatably fitted on the main shaft 35. Circular outer eccentric cams 67 of equal eccentricity are fitted around the outer peripheries of respective inner eccentric cams 66, and substantially horizontal straps 68 of equal length are fitted at their upstream ends (as considered relative to the direction of travel of the stock 78) around the outer peripheries of respective outer eccentric cams 67.

The straps 68 are pivotally connected at their other or downstream ends to the middle parts of respective swinging levers 70 of identical dimensions, which are fixed at their lower proximal ends to a horizontal shaft 69 rotatably supported by the base frame 15. The upper distal ends of the levers 70 are pivotally connected to the ends of respective connecting rods 71, which are connected at their other ends by pivoted connections 72 to the front end part of the shiftable shear housing 19.

The outer eccentric cams 67 are connected by crank pins 76 to respective sliding blocks 75 slidable fitted in the radial slots 74 of the gears 73, which are meshed with respective gears 77 fixed to the third driving shaft 42, and the inner and outer eccentric cams 66 and 67 are driven in mutually opposite directions at the same rotational speed. The combined resultant movement of the inner and outer eccentric cams 66 and 67 rotating through one revolution causes the shiftable shear housing to undergo one cycle of reciprocating movement. In an interval of relatively long length of a rotational angle of 90° of the main shaft 35 for shifting drive, a movement approximating a straight-line movement is imparted to each of the forward stroke and the return stroke of this reciprocating movement at a velocity tuned to the stock traveling velocity, the shearing of the stock being carried out in the interval of equal velocity of the forward stroke.

Figure 6:
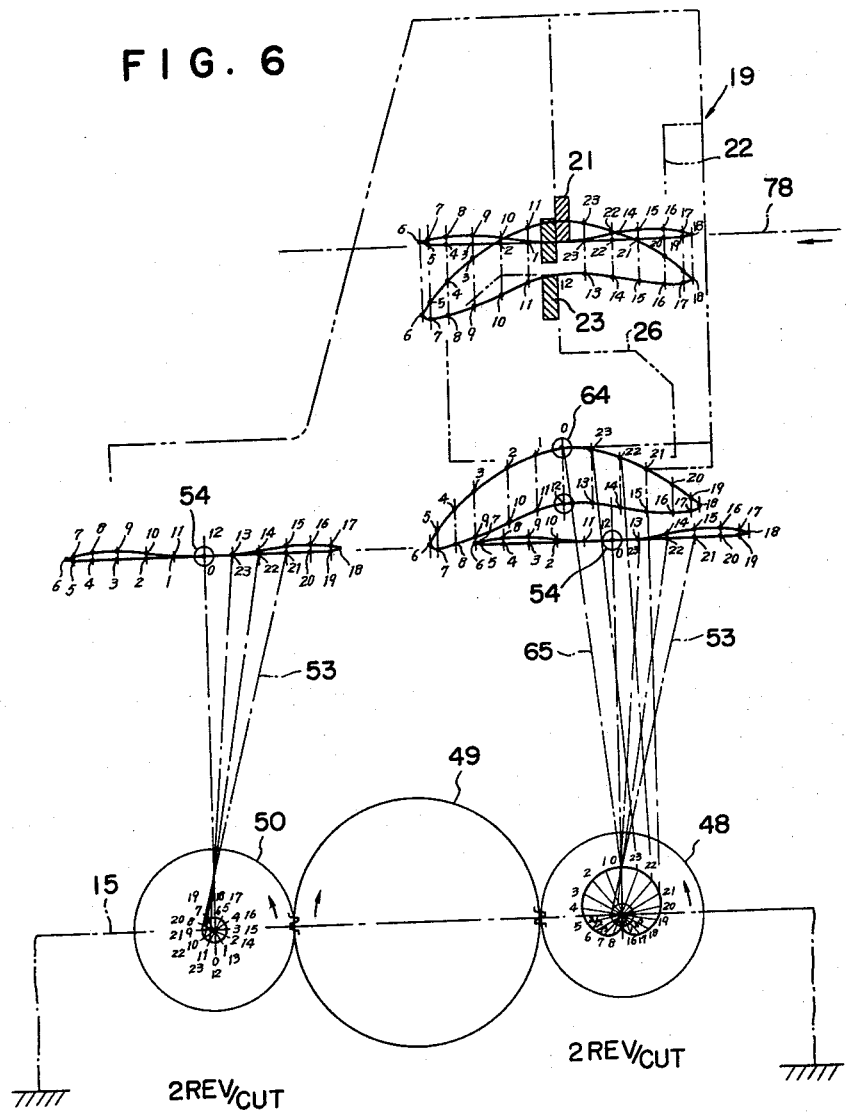
FIG. 6 is a graphical analysis diagram showing the paths of motion of the shiftable shear housing and the liftable knife holder installed in a manner permitting its vertical movement on the shiftable shear housing of the same machine illustrated in FIG. 3.

In the above described first embodiment of the invention, as the stock 78 travels toward the left as viewed in FIG. 3, the inner eccentric cams 66 of the pair of shifting drives 18 are driven to rotate clockwise at a rate of one revolution per cut, while the outer eccentric cams 67 are driven to rotate counterclockwise at a rate of one revolution per cut. At the same time the eccentric cams 52 of the pair of shifting supports 16 are driven to rotate counterclockwise at a rate of two revolutions per cut; the inner eccentric cams 58 of the pair of shearing drives are driven to rotate counterclockwise at a rate of two revolutions per cut; and the outer eccentric cams 61 are driven to rotate counterclockwise at a rate of one revolution per cut. As a result, the shiftable shear housing 19 and the lower knife holder 26 move through paths as indicated in FIG. 6.

Figure 7:
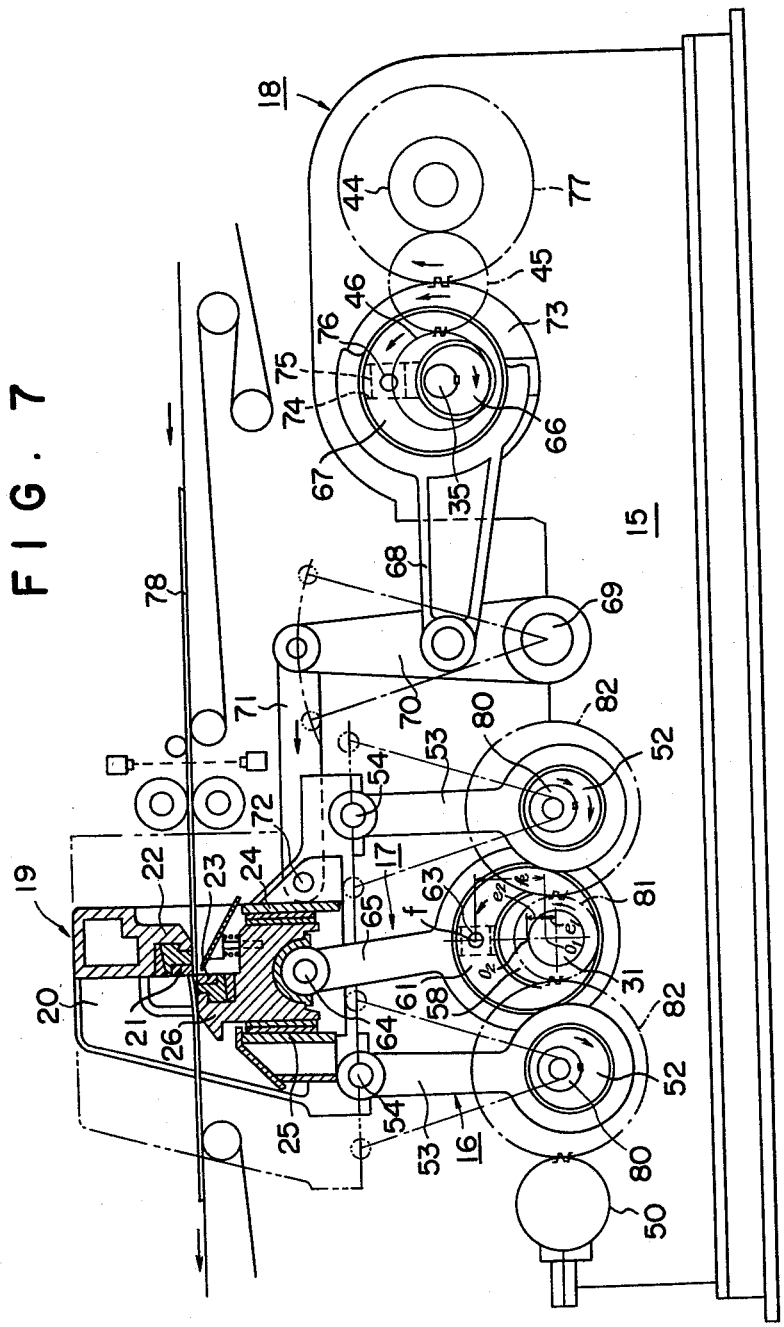
FIG. 7 is a side elevation showing the essential construction of a flying shear machine constituting a second embodiment of the invention.
Figure 8:
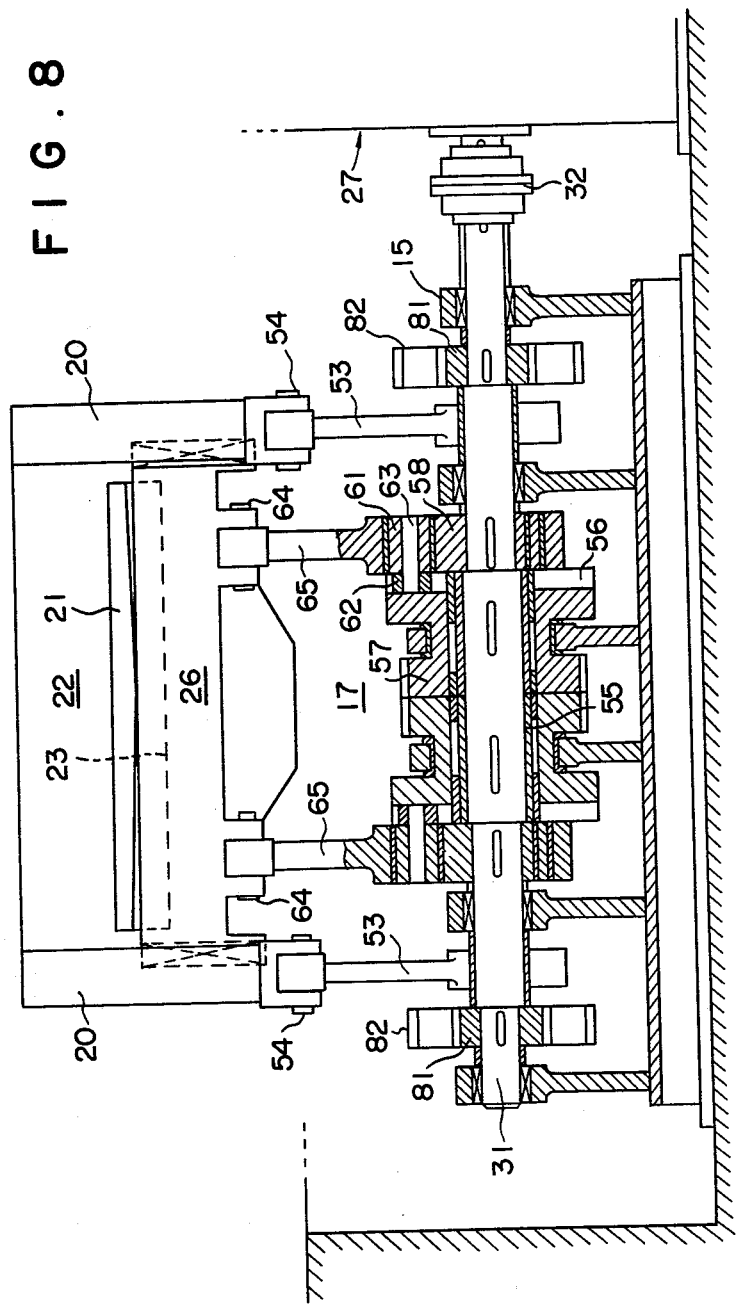
FIG. 8 is an end elevation, with parts cut away and parts in vertical section, of the same machine illustrated in FIG. 7.
Figure 9:
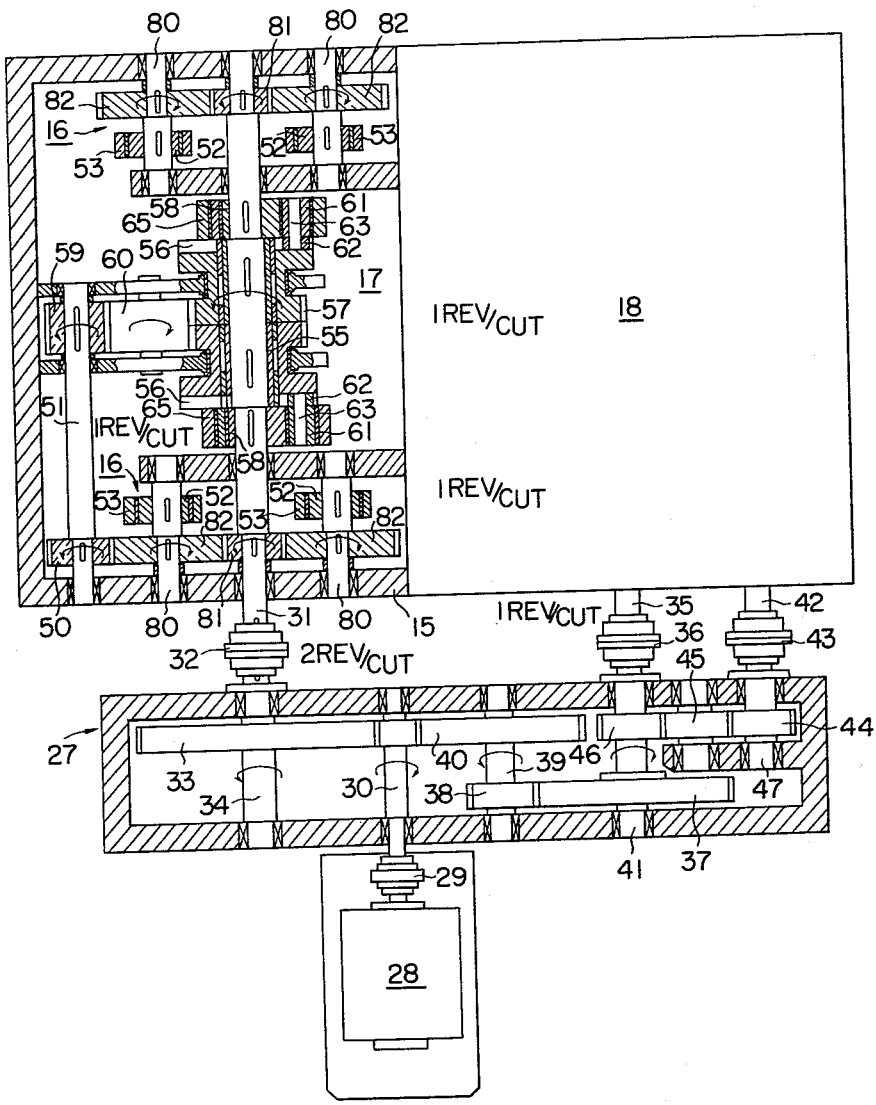
FIG. 9 is a plan view showing the driving system of the same machine shown in FIG. 7.

In a second embodiment of the invention as illustrated in FIGS. 7, 8, and 9, the eccentric cams 52 of the pair of shifting supports 16, which, in the preceding first embodiment of the invention, are rotated counterclockwise at a rate of two revolutions per cut, are rotated clockwise at a rate of one revolution per cut. For this reason, four shafts 80 fixedly supporting respective eccentric cams 52, around which are fitted the lower ends of respective straps 53 are rotatably supported at positions on opposite sides of and parallel to the main shaft 31 for shearing drive near the ends thereof, the main shaft 31 being rotated at a rate of two revolutions per cut. Each pair of these shafts 80 near one end of the main shaft 31 are coupled through a gear 81 and gears 82 of a gear ratio of 1 : 2 to the main shaft 31. Exclusive of the above described features, the construction of this second embodiment of the invention is the same as that of the preceding first embodiment.

Figure 10:
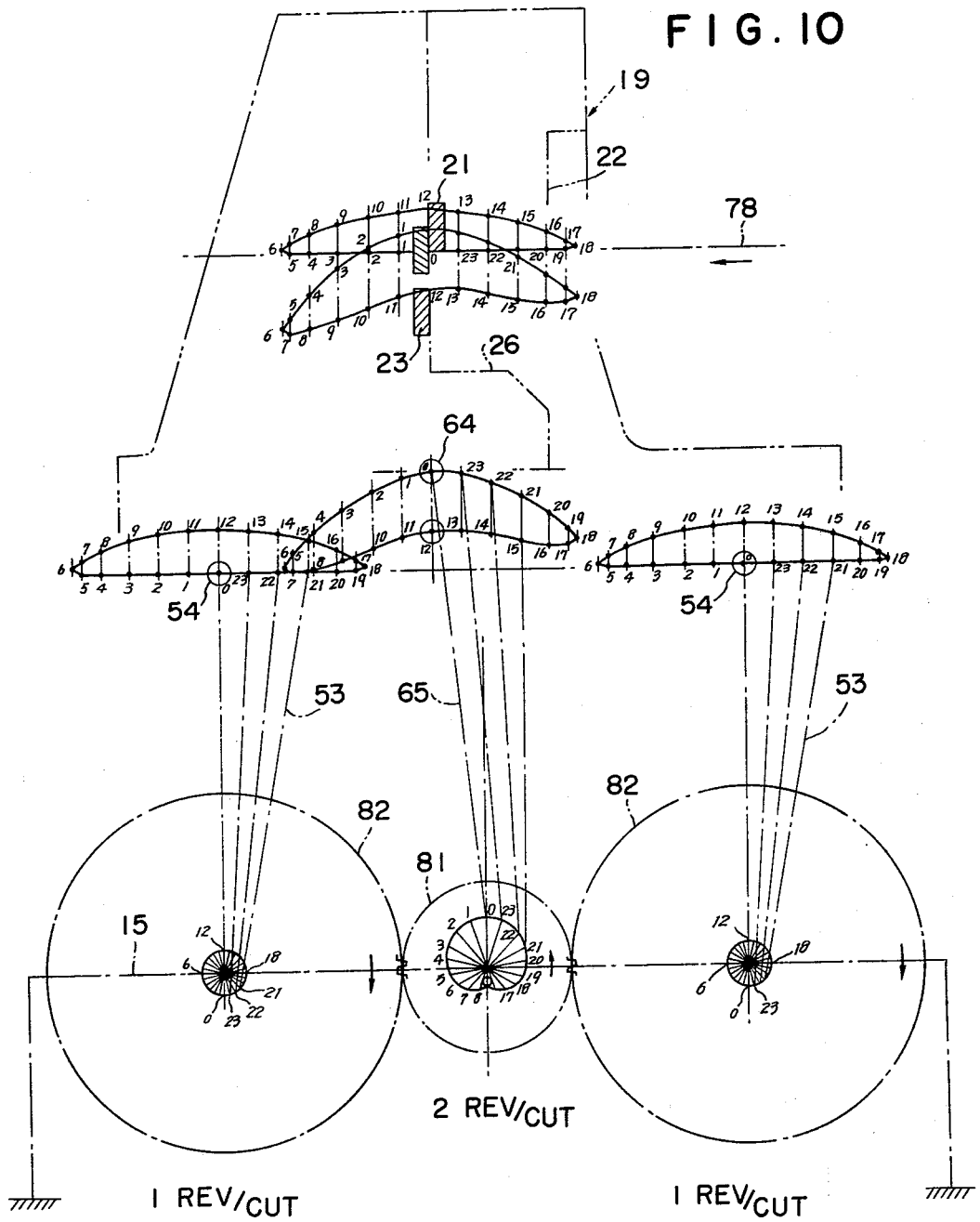
FIG. 10 is a graphical analysis diagram showing the paths of motion of the shiftable shear housing and a liftable knife holder of the same machine shown in FIG. 7.

In the instant second example of the shearing machine of the invention, as the stock material 78 travels leftward as viewed in FIG. 7, the various eccentric cams are driven in the following manner: the inner eccentric cams 66 of the pair of shifting drives 18, one revolution clockwise per cut; the outer eccentric cams 67, one revolution counterclockwise per cut; the eccentric cams 52 of the pair of shifting supports 16, one revolution clockwise per cut; the inner eccentric cams 58 of the pair of shearing drives 17, two revolutions counterclockwise per cut; and the outer eccentric cams 61, one revolution counterclockwise per cut. As a result, the shiftable shear housing 19 and the lower knife holder 26 move along paths as indicated in FIG. 10.

Figure 11:
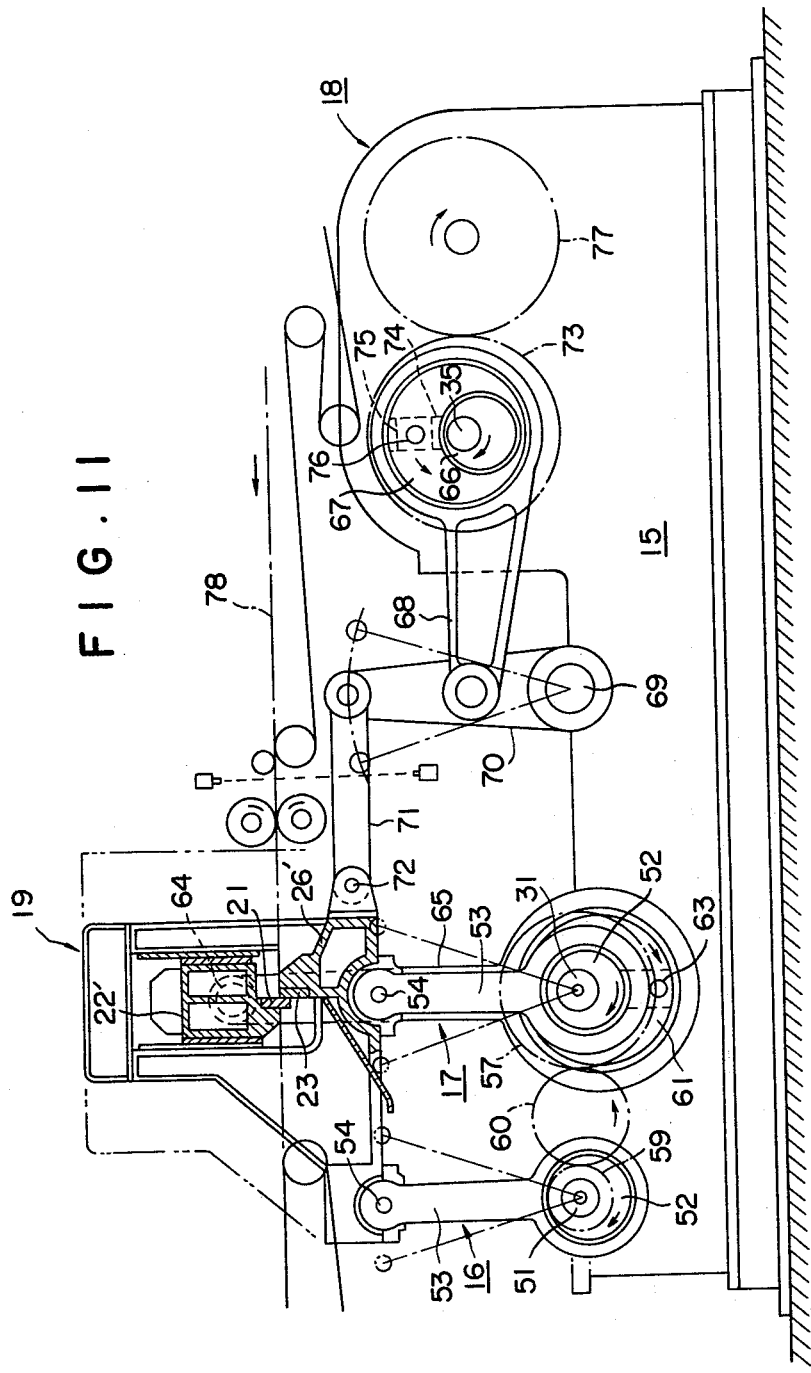
FIG. 11 is a side elevation showing the essential construction of a flying shear machine constituting a third embodiment of the invention.
Figure 12:
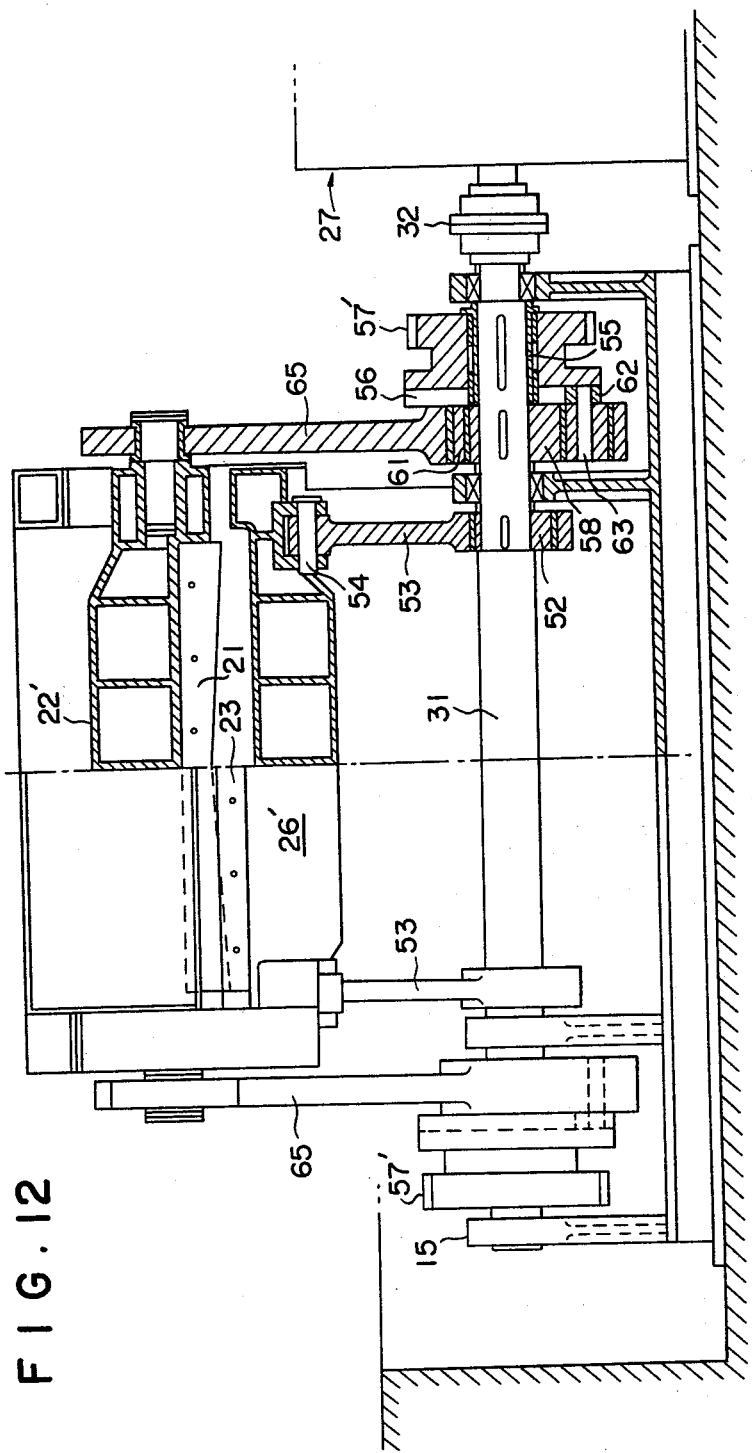
FIG. 12 is an end elevation, with parts cut away and parts in vertical section, of the same machine shown in FIG. 11.
Figure 13:
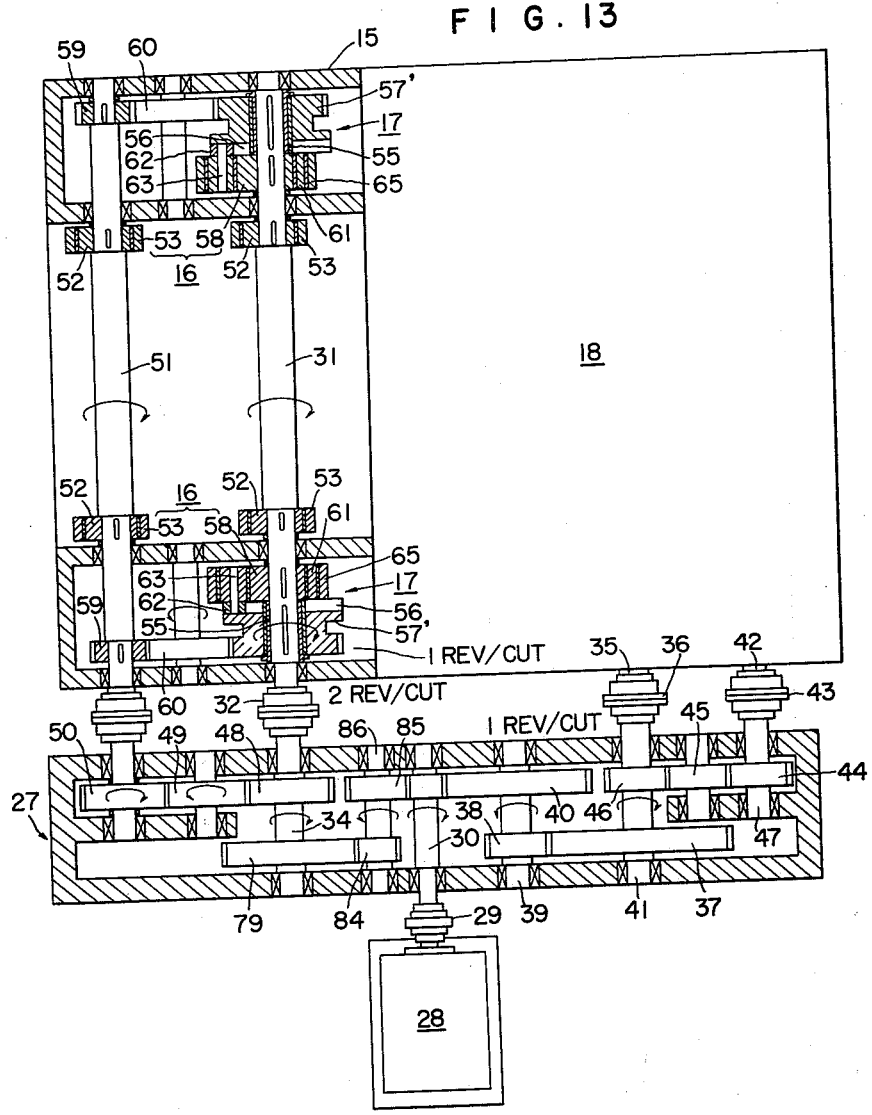
FIG. 13 is a plan view showing the driving system of the same machine shown in FIG. 11.

In a third example of the shearing machine according to this invention as illustrated in FIGS. 11, 12, and 13, a down-cut type of mechanism is used, in contrast to the up-cut type mechanism in the preceding first embodiment of the invention, and, moreover, the rotational direction of the main shaft 31 for shearing drive is clockwise as viewed in FIG. 11, which is opposite to that in the first embodiment.

More specifically, a knife holder 26' carried by the shiftable shear housing 19 is provided in fixed state, and a liftable knife holder 22' is provided in a manner permitting it to move vertically. Accordingly, it is necessary to place the straps 65, 65 of the pair of shearing drives 17 for lifting and lowering the liftable knife holder 22' outside of the knife holder 26'. For this reason, crank mechanisms comprising gears 57' fixed to respective ends of the main shaft for shearing drive 31, inner and outer eccentric cams 58 and 61, and the straps 65 are provided at the ends of the main shaft 31, and crank mechanism comprising eccentric cams 52 of the pair of shifting supports 16 and straps 53 are provided nearer the middle part of the main shaft 31. At the same, gears 48 and 50 of the same pitch diameter and an idler gear 49 for driving the main shaft 31 and the fifth driving shaft 51 in the same direction at the same rotational speed are provided within the gear unit 27, and a counter shaft 86 with a pinion 84 and a gear 85 fixed thereto is interposed between the first driving shaft 34 and the pinion shaft 30. Thus, through the pinion shaft 30, the gear 85, 84 and 79, and the first driving shaft 34, the main shaft 31 for shearing drive is rotated in the clockwise direction.

Figure 14:
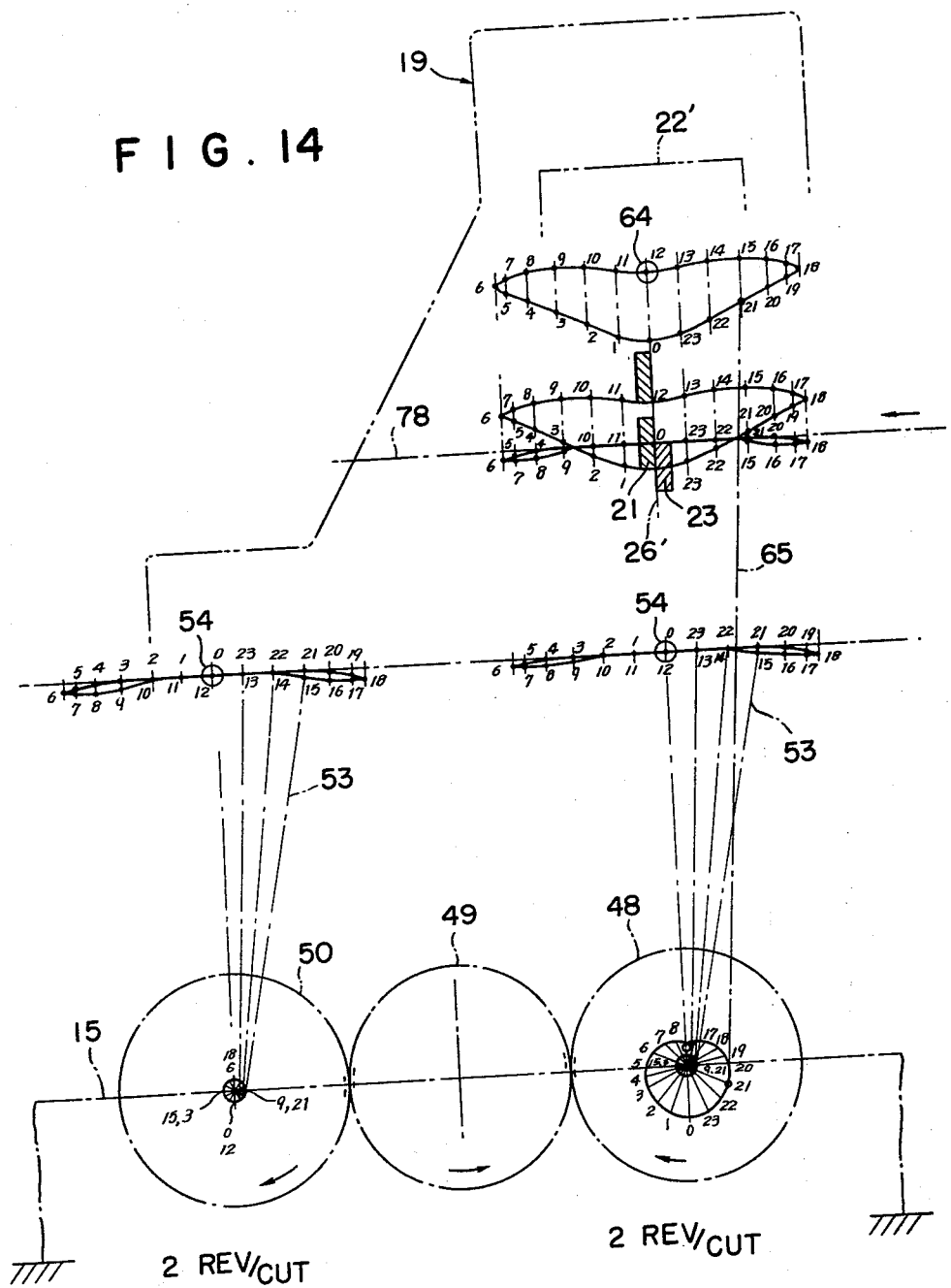
FIG. 14 is a graphical analysis diagram showing the paths of motion of the shiftable shear housing an a liftable knife holder of the same machine shown in FIG. 11.

In the instant third embodiment of the invention, as the stock 78 travels leftward as viewed in FIG. 11, the various eccentric cams are driven in the following manner: the inner eccentric cams 66 of the pair of shifting drives 18, one revolution clockwise per cut; the outer eccentric cams 67, one revolution counterclockwise per cut; the eccentric cams 52 of the pair of shifting supports 16, two revolutions clockwise per cut; the inner eccentric cams 58 of the pair of shearing drives 17, two revolutions clockwise per cut; and the outer eccentric cams 61, one revolution clockwise per cut. As a result the shiftable shear housing 19 and the liftable knife holder 22' move along paths as indicated in FIG. 14.

Next, the movement of the pair of shifting supports 16 comprising parallel crank mechanisms and used commonly in the various embodiments of this invention will be described with reference to FIGS. 15, 16, and 17.

Figure 15:
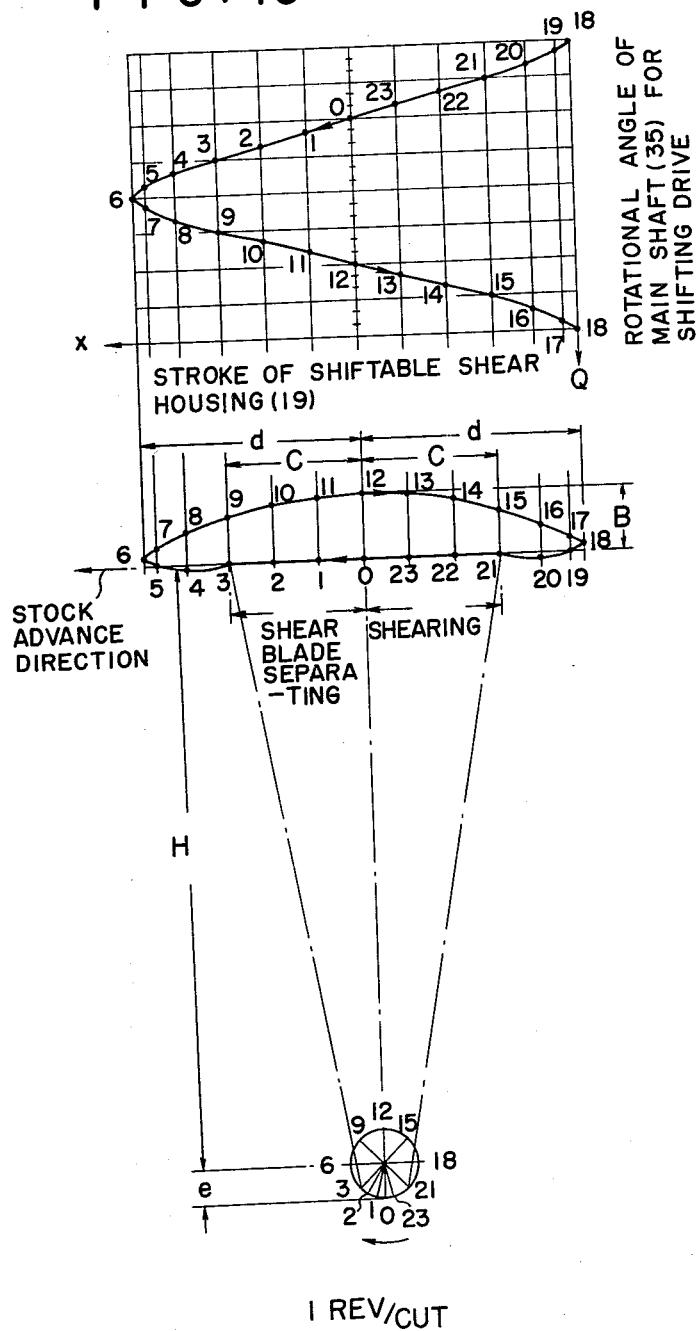
FIGS. 15, 16 and 17 are graphical analysis diagrams respectively showing paths of motion of the shiftable shear housing obtained by the combined motion of the pair of shifting supports and the pair of shifting drives in the embodiments of the invention.

The upper graph of FIG. 15 indicates the relationship between the rotational angle of the main shaft 35 for shifting drive of the pair of shifting drives 18 and the movement distance or stroke of the shiftable shear housing 19, one revolution of 360° of the main shaft 35 being divided into 24 equal parts, each of 15°. In this graph, point 0 is the middle point in the forward stroke of the reciprocating forward-return movement of the shiftable shear housing 19, $2d$ the total movement distance thereof, and $2c$ the distance of the constant-velocity interval thereof.

In the lower part of FIG. 15, which indicates the rotational angle of the eccentric cams 52 of the pair of shifting supports 16, the middle line figure indicates the path of travel of the pivoted connection (pin) 54 of the shiftable shear housing 19 at the time when the eccentric cams 52 rotates clockwise at a rate of one revolution per cut, as the stock 78 travels leftward, by angles each of 15° through positions 0, 1, 2, . . . 23, 0 in conformance with the rotational positions every 15° of 0, 1, 2, . . . 22, 23, 0 of the main shaft 35 for shifting drive. The shiftable shear housing 19 undergoes a movement approximating a straight-line movement in at least the shearing intervals 21 - 22 . . . 2 - 3 of its forward stroke.

Then, under the condition that the shiftable shear housing 19 is supported at the same height at the three points 21, 0 and 3, as a condition for obtaining a straight-line approximating movement thereof at least in the shearing interval, the relationship as expressed by the following equation in terms of the eccentricity $e$ of the eccentric cams 52, the movement distance $c$ from point 21 to point 0 and from point 0 to point 3, and the height H from the center of an eccentric cam 52 to the straight-line part of the movement path of the pin 54 of the shiftable shear housing 19 is valid.

$$(H + e)^2 = (H + e/\sqrt{2})^2 + (c - e/\sqrt{2})^2$$

Then, from $$e = c^2 / (2 - \sqrt{2}) H + \sqrt{2} c,$$

the eccentricity $e$ can be determined.

In the instant embodiment of the invention, one half of the total stroke of the shiftable shear housing 19, that is, $d$, is 368 mm., and $c = 228$ mm. Then, if H is taken as 1,000 mm., $e$ will be approximately 57 mm., and the height B of the crescent described by the pin 54 will be $B = 2e = 114$ mm., which is within practical limits for supporting the shiftable shear housing.

The example indicated in this FIG. 15 corresponds to the second embodiment of this invention. In the shearing interval of its forward stroke, the shiftable shear housing 19 undergoes a straight-line approximating movement, and shearing of the stock material is carried out by the upper and lower shear blades 21 and 23. Then, in its return stroke, the shiftable shear housing 19 separates from the stock material, and both the upper and lower shear blades 21 and 23 separate for away from the stock material. Therefore, this shear mechanism is highly effective in a flying shear machine for shearing hot stock wherein there is a great necessity of avoiding the effects of the stock on the shear blades.

Figure 16:
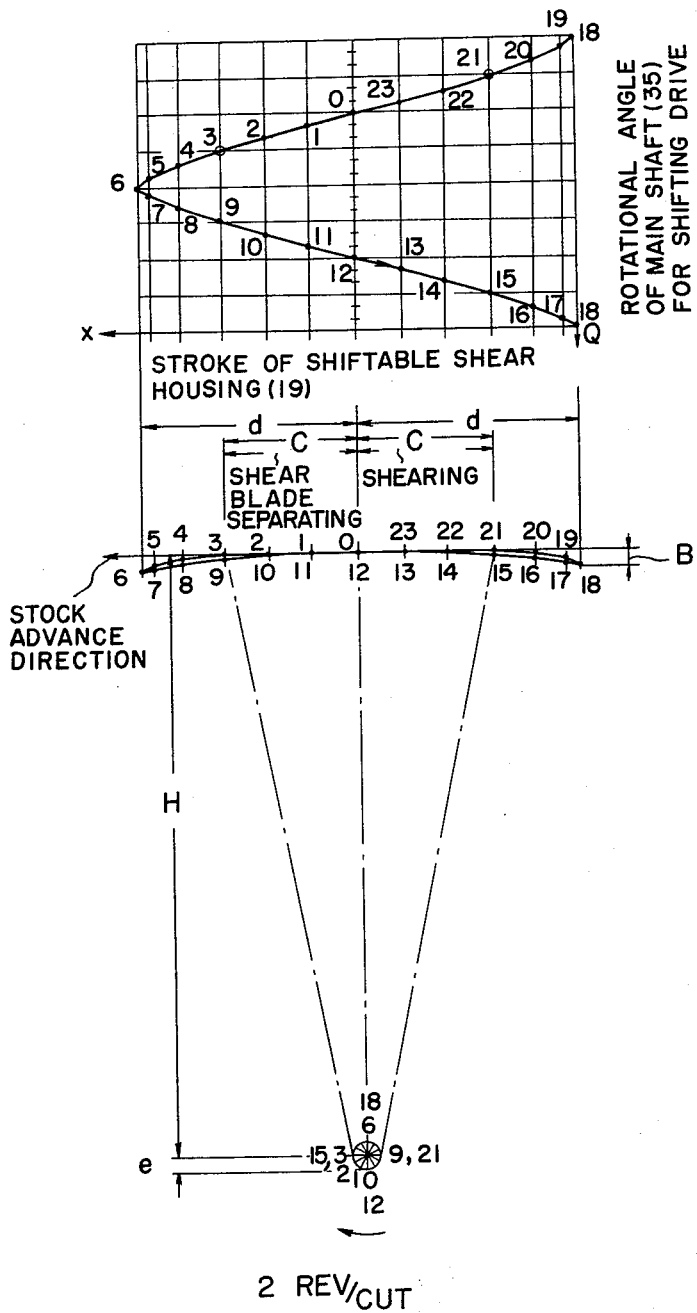
Figure 17:
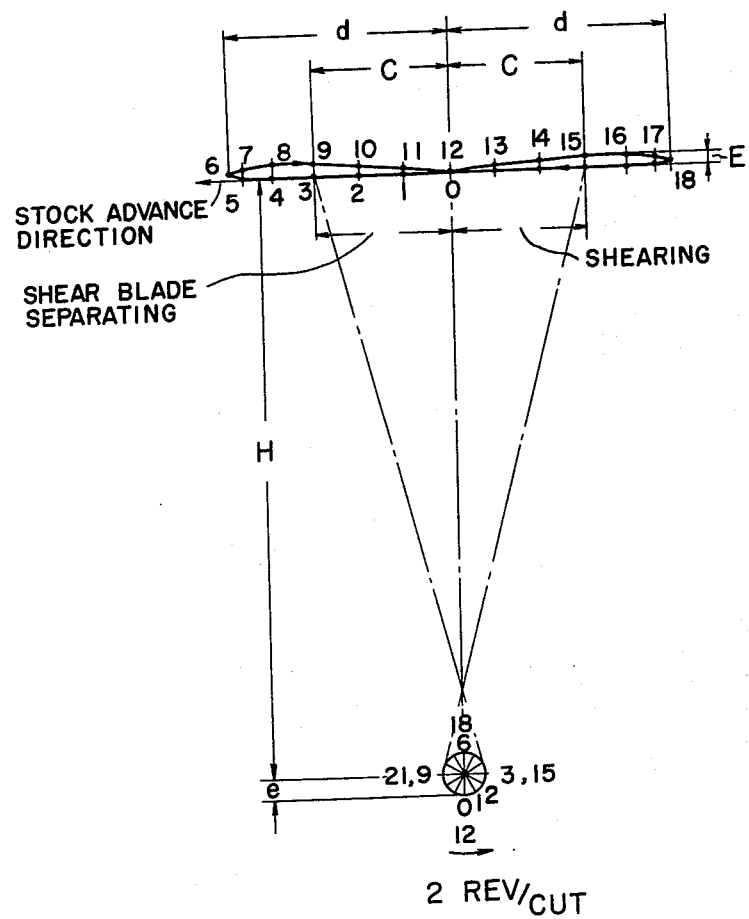

Each of the lower parts of FIGS. 16 and 17 indicate the rotational angle of the eccentric cams of the pair of shifting supports 16. The middle part of FIG. 16 and the upper part of FIG. 17 respectively indicate the path of movement imparted to the shiftable shear housing 19 when, in conformance with the rotational positions 0, 1, 2, . . . 22, 23, 0 at 15° intervals of the main shaft 35 for shifting drive indicated in the graph at the upper part of FIG. 16, the eccentric cams 52 are rotated through rotational positions 1, 2, . . . 22, 23, 0 at intervals of twice the rotational angle, that is, 30° , in the clockwise direction in the case illustrated in FIG. 16 and in the counterclockwise direction in the case illustrated in FIG. 17, at the time of leftward travel of the stock, rotating two revolutions per revolution of the main shaft 35 for shifting drive, that is, two revolutions per cut. In this case, the shiftable shear housing 19 undergoes straight-line approximating movement in each of the forward and return strokes, and a movement through a path which is closest to a straight line is obtained between points 21 -

22 ... 2 – 3 of the shearing interval of the forward stroke.

Then, under the condition that the shiftable shear housing 19 is supported at the same height at the three points 21, 0, and 3, as a condition for obtaining a straight-line approximating movement thereof at least in the shearing interval, the relationships as expressed by the following equations, respectively in the cases of FIGS. 16 and 17, in terms of the quantities $e$, $c$, and H used in the above description with reference to FIG. 15 are valid.

$$(H + e)^2 = H^2 + (c - 3)^2$$

$$(H + e)^2 = H^2 + (c + e)^2$$

In the case of FIG. 16, $$e = c^2 / 2(H + c)$$

In the case of FIG. 17, $$e = c^2 / 2(H - c)$$

From these equations, the eccentricity can be determined. In the instant example, $c = 228$ mm. Then, if H is taken as 1,000 mm., $e = 21$ mm. in the case of FIG. 16, while $e = 34$ mm. in the case of FIG. 17, which are not excessive. Thus, a straight-line movement which is amply practical for supporting the shiftable shear housing is obtainable.

Figure 1:
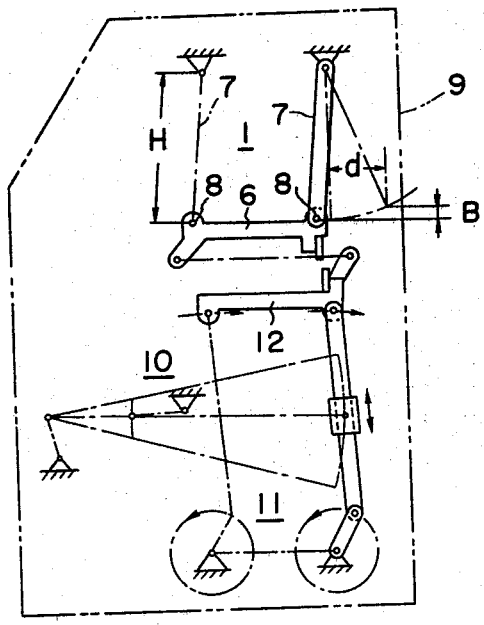
FIG. 1 is a schematic diagram, in side elevation, showing essential mechanisms in one example of a known flying shear machine.

The example illustrated in FIG. 16 corresponds to the case of the third embodiment of this invention, while that illustrated in FIG. 17 corresponds to the case of the first embodiment, the movements in the up and down direction of the shiftable shear housing 19 being held at amply small values in both cases. When this is compared, for example, as the same shiftable shear housing supporting device with the parallel link mechanism 1 illustrated in FIG. 1, the distance B of movement in the up and down direction of the shear blade supporting beams 6 shown in FIG. 1 in terms of the length H of the pendulum arms 7 shown in FIG. 1 and one half $d$ of the total stroke of the reciprocating forward and return movement, and with $d = 368$ mm. and $H = 1,000$ mm. similarly as in the instant embodiment of this invention, becomes $$B = H - \sqrt{H^2 - d^2} = 70 \text{ mm.}$$

On one hand, in the case illustrated in FIG. 16, $e = 21$ mm. for $d = 368$ mm. and $B = 1,000$ mm. as stated above, and the distance B of up and down movement of the shiftable shear housing 19 becomes as follows.

$$t B = (H - e) - \sqrt{(H + e)^2 - d^2} = 27 \text{ mm.}$$

The value B becomes a maximum in the vicinity of points 15 and 16 in the case shown in FIG. 16. For this reason, when calculation is carried out for the point 15, for example, $e = 34$ mm. for $c = 228$ mm. and $H = 1,000$ mm. as mentioned hereinbefore. Then, from $$B = \sqrt{(H + 2)^2 - (c - e)^2} - H,$$

B becomes 16 mm. Even when an allowance is made for some increase at point 16, the value of B is within $B = 20$ mm. Therefore, this becomes approximately ⅓ of the movement in the up and down direction of the parallel link mechanism 1 shown in FIG. 1.

Since, in each of the examples indicated in FIGS. 16 and 17, the movement of the shiftable shear housing 19 in the up and down direction can be held to a very small magnitude, the vibration load in the vertical direction applied by the inertial mass of the shiftable shear housing 19 to the shear machine base is small, whereby the design of the shear machine base is facilitated. Furthermore, the noise in the plant as a whole due to this vertical vibration can be reduced.

Next, the shearing drives comprising crank mechanisms having inner and outer eccentric cams and used commonly in the embodiments of this invention will be described in specific detail.

Figure 18:
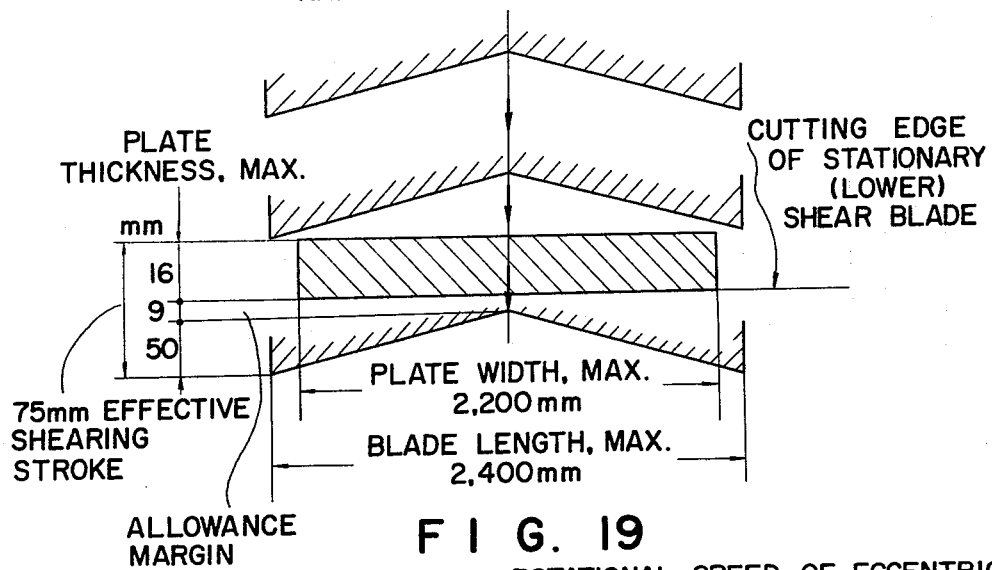
FIG. 18 is a diagrammatic end view indicating one example of an effective shearing stroke of a liftable shear blade.

FIG. 18 indicates the effective stroke (i.e., the net stroke in the vertical direction of the liftable shear blade necessary for shearing the stock) required for the pair of shearing drives 17. In the case of a maximum plate thickness of 16 mm. of the stock, a maximum plate width of 2,200 mm., a length of the upper and lower shear blades of 2,400 mm., and a double rake of an inclination of 1/24 of the shear blade, the effective shearing stroke can be determined with an allowance of 9 mm. as $16 + [2400/(24 \times 2)] + 9 = 75$ mm.

Figure 2:
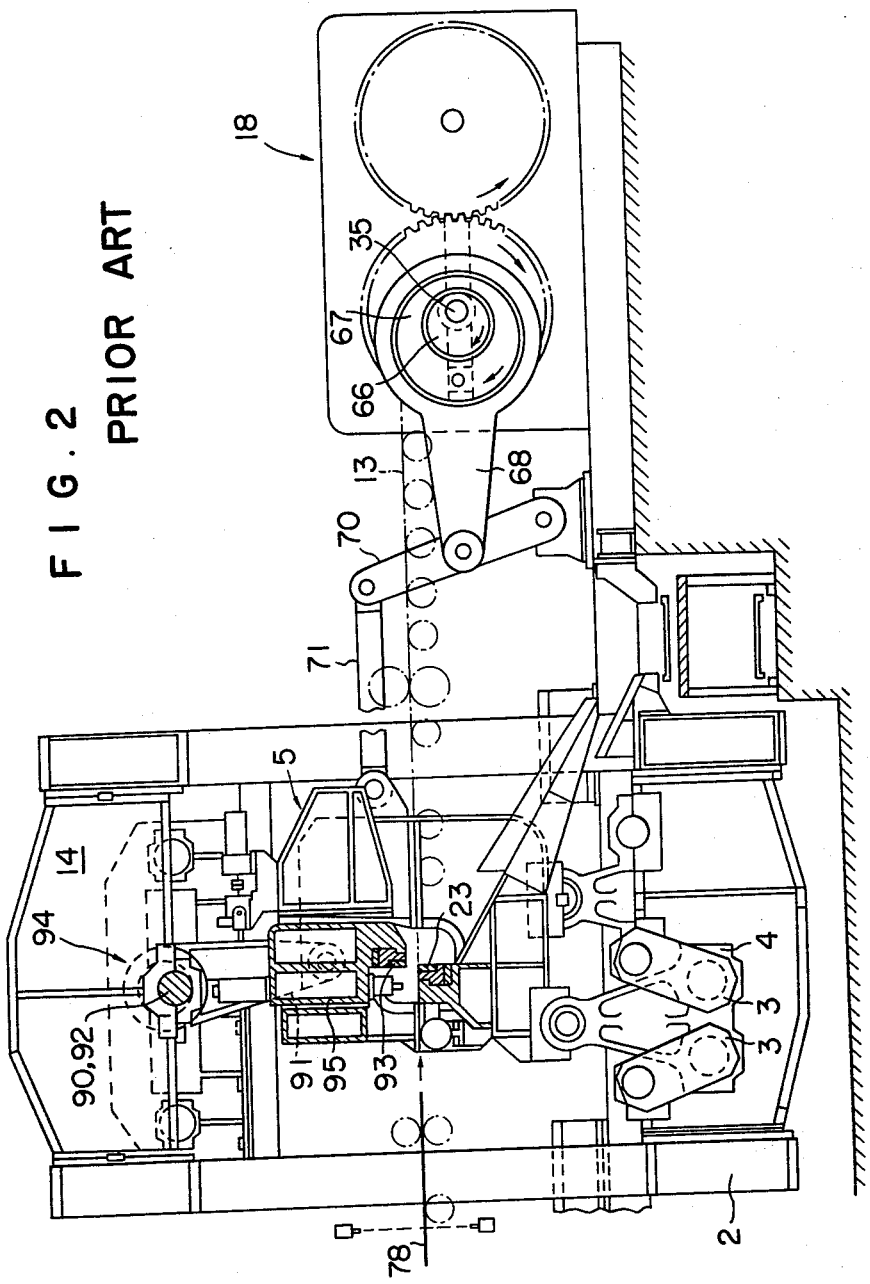
FIG. 2 is a side elevation showing another example of a known flying shear machine.

If this effective shearing stroke were to be achieved by means of a pitman 91 and a main shaft 90 for shearing drive with an eccentric cam 92 fixed thereto as shown in FIG. 2, the rotational angle $\alpha$ of the eccentric cam 92 for the purpose of realizing the effective shearing stroke in this case will be approximately 45° as indicated in FIG. 32 since the main shaft 90 for shearing drive with the eccentric cam 92 fixed thereto and the main shaft 35 for shifting drive are being driven at the same rotational speed and since the rotational angle diagram of the main shaft 35 for shifting drive is as shown in FIG. 31. Therefore, the eccentricity (crank radius) R of the eccentric cam 92 will be as follows.

$$R = s/(1 - \cos\alpha) = 75/(1 - \cos 45°) = 256 \text{ mm.}$$

The total stroke in the vertical direction of the liftable upper shearing blade 93 is 2R and, as indicated in FIG. 32, will be approximately 500 mm., which is an unnecessarily large vertical movement. For this reason, the height of the shiftable shear housing 5, which guides the liftable upper knife holder 95, will become large, and the entire machine will become of excessively large size. Moreover, the inertial mass, i.e., the so-called shifting mass, of the parts participating in the vertical and horizontal movements of the liftable upper knife holder 95 will increase.

As a measure for solving this problem, a method wherein an upper knife holder drive 94 as shown in FIG. 2 and a pair of shifting drives 18 (of the same construction as those of the instant embodiment of the invention) are driven separately, and, moreover, the motor of the upper knife holder drive 94 is operated intermittently and, moreover, in a manner such the main shaft 90 for shearing drive provided with the eccentric cam 92 fixed thereto is driven at a higher speed than the main shaft 35 for shifting drive of the pair of shifting drives 18 thereby to increase the rotational angle of the eccentric cam 92 for realizing an effective shearing stroke has been proposed (as disclosed in the specification of U.S. Pat. No. 3,811,354).

Figure 19:
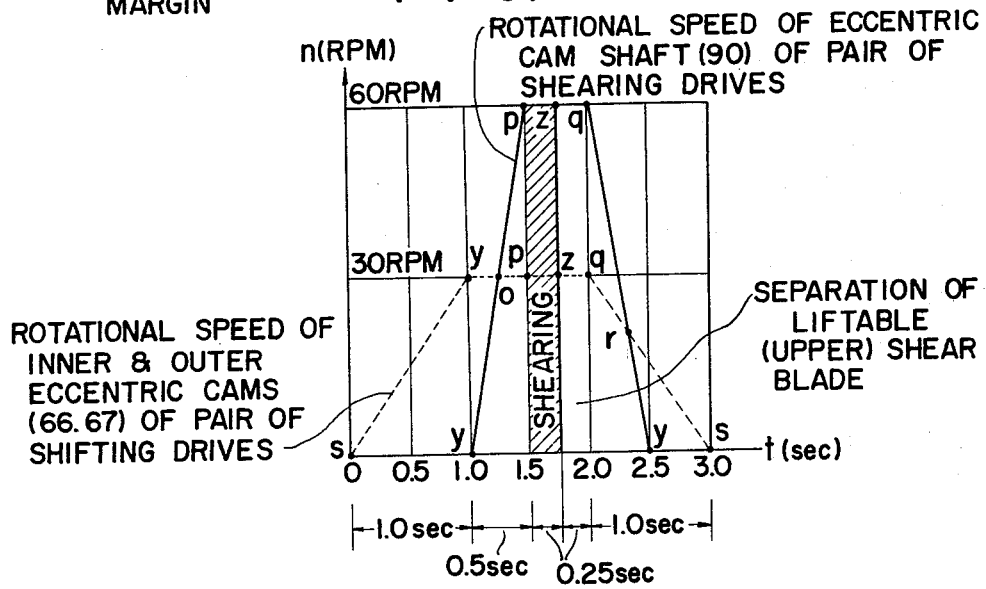
FIG. 19 is a time chart indicating one example of the method of driving the shearing device in a known machine.
Figure 33:
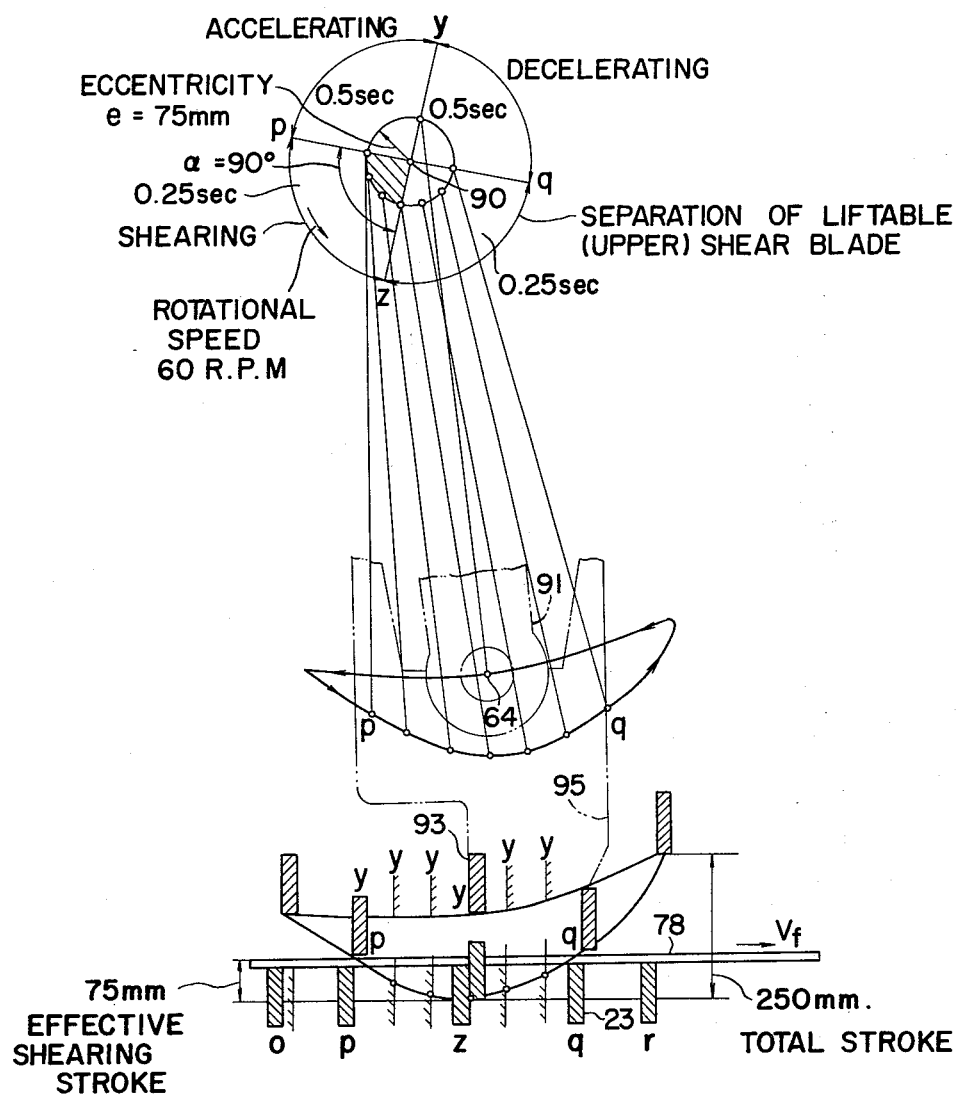
FIG. 33 is a combination of a rotational angle diagram of the eccentric cam shaft of the pair of shearing drives according to the shearing drive method indicated in FIG. 19 and a diagram indicating the path of motion of a liftable shear blade of the same.

In this arrangement, by selecting, for example, a rotational speed of 30 rpm. for the inner and outer eccentric cams 66 and 67 provided on the main shaft 35 for shifting drive of the pair of shifting drives 18 and an acceleration time thereof of 1 second as indicated in FIGS. 19 and 33 and selecting the rotational speed of the main shaft 90 for shearing drive with the eccentric cam 92 fixed thereto of the upper knife holder drive 94 at twice the speed, that is, 60 rpm., thereby to start at a constant-speed drive starting point y of the pair of shifting drives 18 and to realize an effective shearing stroke of 75 mm. with a rotational angle α of 90° of the eccentric cam 92. For this reason, the eccentricity e of the eccentric cam 92 is given by $$e = (\text{effective shearing stroke}) / (1 - \cos \alpha)$$
$$= 75 \text{ mm.,}$$

which is relatively small. Furthermore, the total stroke of the liftable upper knife holder can be held at a small value of the order of 250 mm. as indicated in FIG. 33.

However, when the rotation speed of the inner and outer eccentric cams 66 and 67 of the pair of shifting drives 18 is increased from 30 rpm. to 50 rpm., for example, the acceleration time of the pair of shifting drives 18 becomes 1 ×0 3/5 = 0.6 sec., and the rotational speed of the main shaft 90 for shearing drive with the eccentric cam 92 fixed thereto of the upper knife holder drive 94 becomes twice or 100 rpm., whereby an acceleration time of only 0.3 sec. can be taken. For this reason, the motor of the upper knife holder drive 94 is required to have a high power output in order to obtain the extremely high acceleration, wich is uneconomical and is a problem accompanying speedups.

In the pair of shearing drives 17 comprising crank mechanisms having inner and outer eccentric cams of the instant embodiment of the invention, the inner and outer eccentric cams 58 and 61 thereof are rotated in the same directions at mutually different rotational speeds, for example, with a rotational speed ratio of 2 : 1 or 3 : 1, and the displacement due to the combined resultant movement thereof is used for the shearing stroke, whereby unnecessary vertical movement of the liftable knife holder relative to the effective shearing stroke is held at the minimum limit, and the power required for the acceleration of the shearing drive system is caused to be the minimum.

More specifically, as shown in FIG. 7, the eccentric point of the inner eccentric cams 58 of the pair of shearing drives 17, that is the center of rotation of the outer eccentric cams 61 will be designated by $O_1$, the eccentricity thereof by $e_1$, the eccentric point of the outer eccentric cams 61 by $O_2$, the eccentricity thereof by $e_2$, and the distance between the center of rotation $O_1$ of the outer eccentric cams 61 and the connection point $f$ of the crank pin 63 of the outer eccentric cams 61 by $k$.

Figure 20:
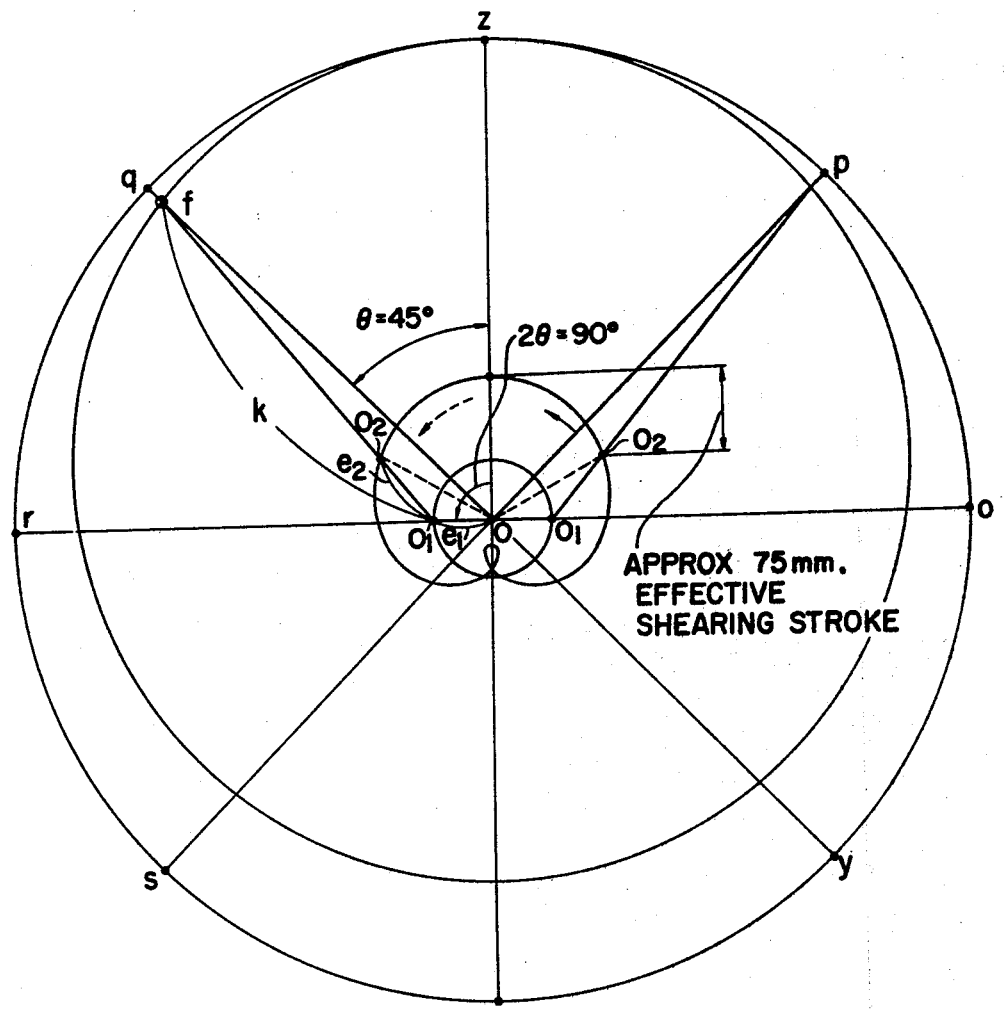
FIGS. 20 and 21 are graphical analysis diagrams respectively indicating examples of paths of motion of inner and outer eccentric cams of the shearing drive device in an embodiment of this invention, FIG. 20 illustrating the case where the rotational speed ratio of the inner and outer eccentric cams is 2 : 1, FIG. 21 illustrating the case where this ratio is 3 : 1.
Figure 22:
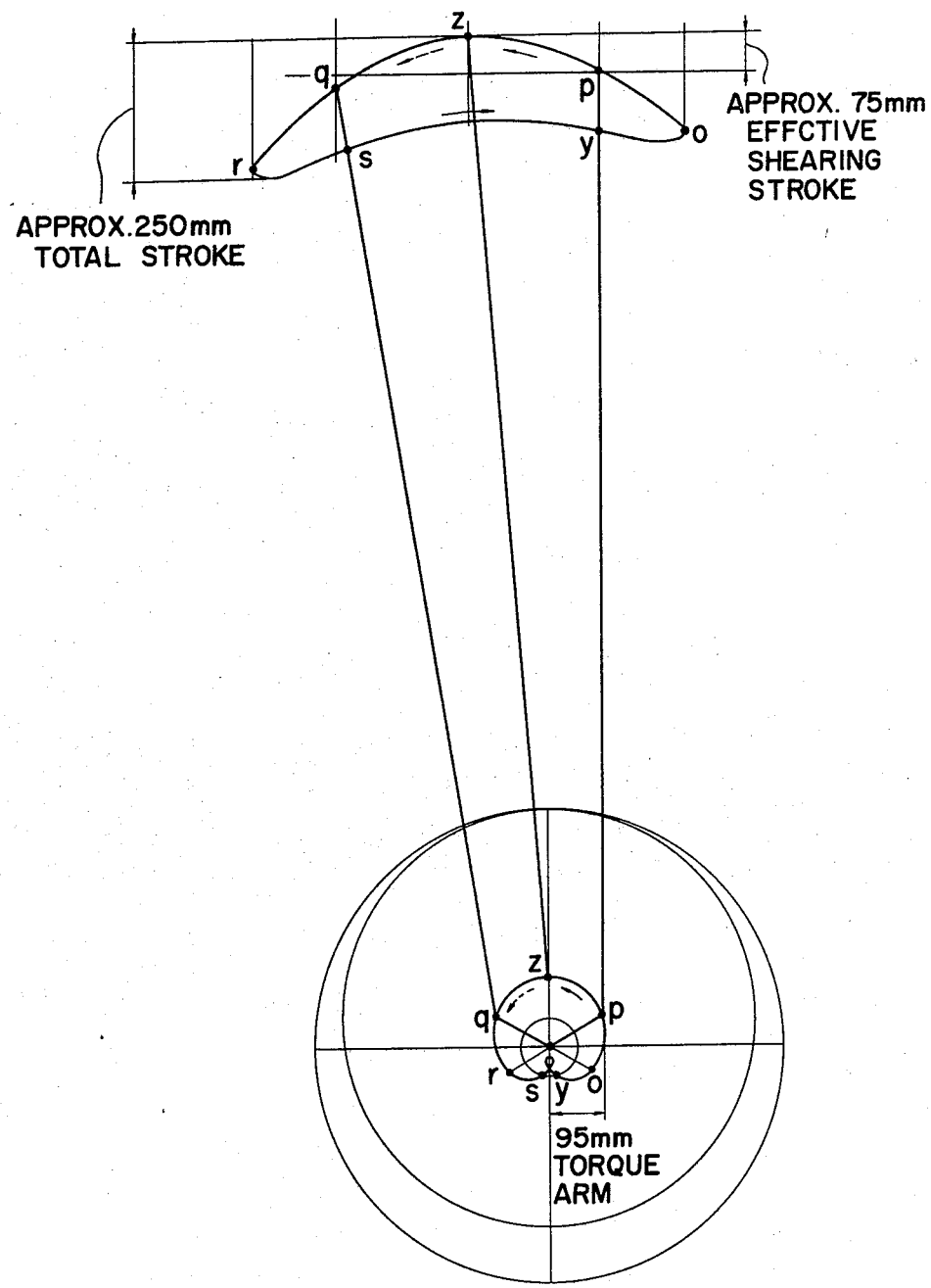
FIG. 22 is a graphical analysis diagram indicating the path of motion of the liftable knife holder resulting from the combined movement of the inner and outer eccentric cams shown in FIG. 20.

Then, under the conditions of $e_1 = 53$ mm., $e_2 = 75$ mm., a combined eccentricity e of the inner and outer eccentric cams 58 and 61 of $e = 128$, and a rotational speed of the inner eccentric cams 58 which is two times that of the outer eccentric cams 61, the points $O_1$, $O_2$, and $f$ described paths as shown in FIG. 20, while the liftable knife holder 26 traces a crescent shaped path as shown in the upper part of FIG. 22 in correlation with the reciprocating movement of the shiftable shear housing 19.

Figure 21:
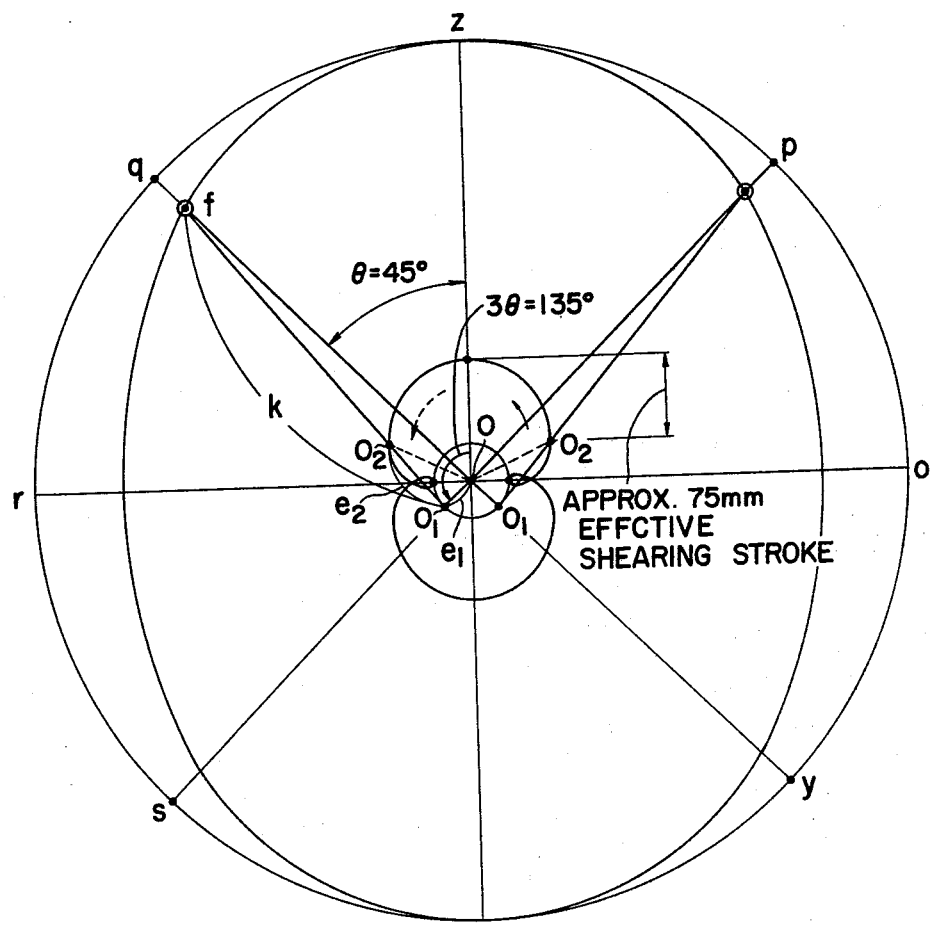
Figure 23:
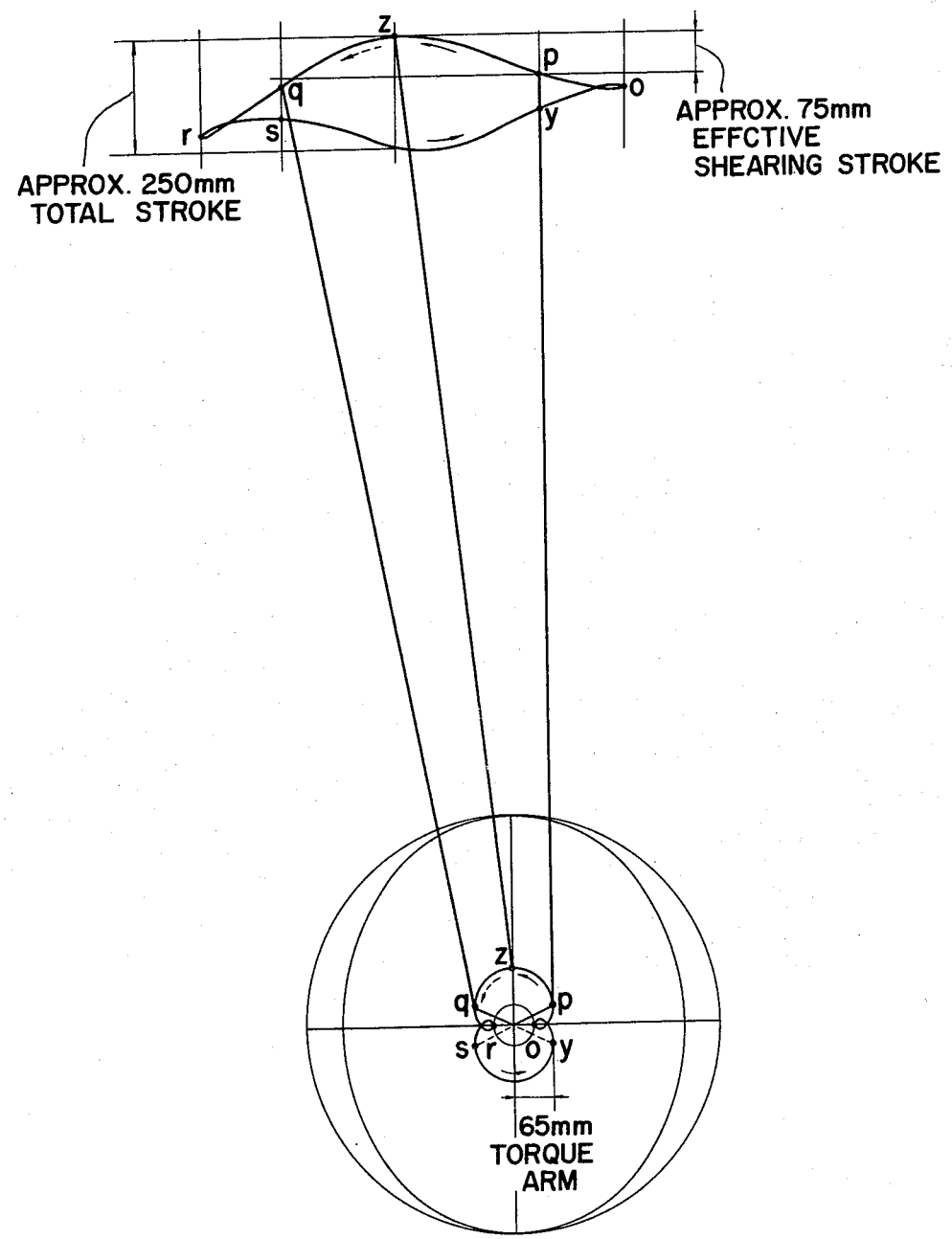
FIG. 23 is a graphical analysis diagram indicating the path of motion of the liftable knife holder resulting from the combined movement of the inner and outer eccentric cams shown in FIG. 21.

Under the conditions of $e_1 = 33$ mm., $e_2 = 66$ mm., $e = e_1 + e_2 = 99$ mm., and a rotational speed of the inner eccentric cams 58 which is three times that of the outer eccentric cams 61, the points $O_1$, $O_2$, and $f$ describe paths as shown in FIG. 21, while the liftable knife holder 26 traces a path as shown in FIG. 23 in correlation with the reciprocating movement of the shiftable shear housing 19.

Then, as the outer eccentric cams 61 rotate 90° through the shearing interval $p - z - q$, the eccentric point $O_2$ of the outer eccentric cams 61 undergoes an effective shearing stroke of approximately 75 mm. as indicated in FIGS. 20 and 21 as a combined resultant movement of the inner and outer eccentric cams 58 and 61. The total stroke of the liftable knife holder 26 for obtaining this effective stroke is approximately 250 mm. in the case indicated in FIG. 22 and approximately 200 mm. in the case indicated in FIG. 23.

Accordingly, this total stroke in the instant embodiment of the invention is one half or less than one half of the approximately 500 mm. as indicated in FIG. 32, which is the total stroke required by the upper knife holder 95 constituting a movable knife holder in the known machine illustrated in FIGS. 2 and 32, in which the eccentricity (crank radius) of the eccentric cam 92 is 256 mm. for obtaining the same effective shearing stroke of 75 mm. Another advantageous feature is that the torque arm at the shearing starting point P is approximately 95 mm. in the case indicated in FIG. 22 and approximately 65 mm. in the case indicated in FIG. 23, which values are one half or less in comparison with the torque arm of approximately 180 mm. in the machine illustrated in FIGS. 2 and 32.

Furthermore, in the case illustrated in FIGS. 19 and 33, the total stroke of the liftable knife holder for obtaining an effective shearing stroke of 75 mm. is approximately 250 mm. as indicated in FIG. 33, and the torque arm of the shearing starting instant is 75 mm. Therefore, although the torque arm in the case indicated in FIG. 22 is somewhat long, the total stroke thereof is the same, and the torque arm and the total stroke of the case indicated in FIG. 23 are both less than those of the case illustrated in FIGS. 19 and 33.

In the instant embodiment of the invention, moreover, the acceleration time of the pair of shearing drives 17 is the same as that of the main shaft 35 for shifting drive of the pair of shifting drives 18 since the outer eccentric cams 61 thereof is being driven at the same instant and the same rotational speed as the main shaft 35. This acceleration time is 1 sec. at 30 rpm. of the main shaft for shifting drive and 0.6 sec. at 50 rpm., which are respectively twice the corresponding acceleration times of 0.5 sec. at 30 rpm. and 0.3 sec. at 50 rpm. of the main shaft 90 for shearing drive with the eccentric cam fixed thereto of the shearing drive device illustrated in FIGS. 19 and 33 for the same 90° acceleration. Therefore, in accordance with the instant embodiment of this invention, the shiftable shear housing 19 can be made to have a small size of the same order as that illustrated in FIGS. 19 and 33, and, moreover, in high-speed shearing operation, the power required for acceleration of the shearing drive system can be greatly reduced in comparison with that of the example illustrated in FIGS. 19 and 33.

In accordance with this invention, as described above, a parallel crank mechanism, which requires far less installation area than the Robert's mechanism (comprising a pair of links 3 and Tee-type link 4 as shown in FIG. 2), is utilized as means for supporting the shiftable shear housing, and, with this parallel crank mechanism, a straight-line approximating movement is imparted to the shiftable shear housing at least in the shearing interval. Accordingly, the shear machine of the invention employing this crank mechanism is highly suitable for flying shearing of heavy-gage steel plate requiring a relatively long speed-synchronizing interval of plate thicknesses of, for example, 6 mm. or more, or 9 mm. or more.

Furthermore, since this parallel crank mechanism for supporting the shiftable shear housing and the crank mechanism of the pair of shearing drives are coupled to a common motive power transmitting mechanism, and this power transmitting mechanism and the pair of shifting drives are coupled to a common driving power source, operational control is facilitates, and the electrical system can be simplified. In addition, all of the driving mechanisms constituting the flying shear machine can be compactly installed on the base, whereby reduction in size and weight and simplification of the flying shear machine can be achieved. Moreover, by appropriately selecting the ratio of the rotational speeds of the cranks of the above mentioned parallel crank mechanism and of the main shaft for shifting drive of the pair of shifting drives, the vertical movement of the shiftable shear housing can be held to a minimum, and the vibration load in the vertical direction can be reduced.

Furthermore, the forward stroke is substantially an ideal approximation of a straight line, while the return stroke is an ideal peaked curve such as that required for hot shearing, whereby movements in conformance with the requirements are obtained. Still another advantageous feature is that, since a crank mechanism having inner and outer eccentric cams are employed in the pair of shearing drives, and the inner and outer eccentric cams are adapted to be driven in the same direction with one eccentric cam at a slower speed than the other and, moreover, at the same time and the same rotational speed as the main shaft for shifting drive of the pair of shifting drives, the total generated stroke can be held at a minimum relative to the effective shearing stroke, and the shiftable shear housing can be made small. At the same time, in high-speed, high-load shearing of the order of 50 cuts per minute, for example, the power required for the acceleration of the shearing driving system can be greatly reduced. Thus, a compact and economical flying shear machine can be realized.

As described above, in each of the first embodiment of the invention illustrated in FIGS. 3, 4, 5, and 6, the second embodiment illustrated in FIGS. 7, 8, 9, and 10, and the third embodiment illustrated in FIGS. 11, 12, 13, and 14, the shiftable shear housing is supported by a parallel crank mechanism, and a common driving power source, for example, the motor 28, is used for driving this parallel crank mechanism, the pair of shifting drives, and the pair of shearing drives.

However, when the plate thickness of the stock to be sheared increases further, and an even higher shearing power, that is, motor power, is required, there arises the necessity of providing separate driving power sources, namely, a motor 97 for driving the pair of shifting drives and a motor 96 for driving the pair of shearing drives. The reason for this is that, if a common motor were to be used to function doubly as a power source for these two drives, it would necessarily be extremely large with a large inertia, and the selection of such a motor would be difficult.

In such a case, it becomes necessary to select either of the following two methods. The first method is to use the driving power source, i.e., the motor 97, of the pair of shifting drives also as the driving power source of the above mentioned parallel crank mechanism, without providing a separate power source. The alternative second method is to use the driving power source, i.e., the motor 96, of the pair of shearing drives also as the driving power source of the parallel crank mechanism.

In view of the above described necessity, it is a further object of this invention to provide a rational flying shear machine wherein the shiftable shear housing is supported by a parallel crank mechanism which is driven also by the driving power source of the pair of shifting drives for shifting the shiftable shear housing or of the pair of shearing drives for lifting and lowering the liftable knife holder of the shiftable shear housing, the parallel cranks being caused to rotate one through two revolutions per revolution of the output shaft of the pair of shifting drives, and a straightline approximating movement along the traveling direction of the stock is imparted to the shiftable shear housing in at least the shearing interval of the forward stroke thereby to conform to the required performance.

Figure 24:
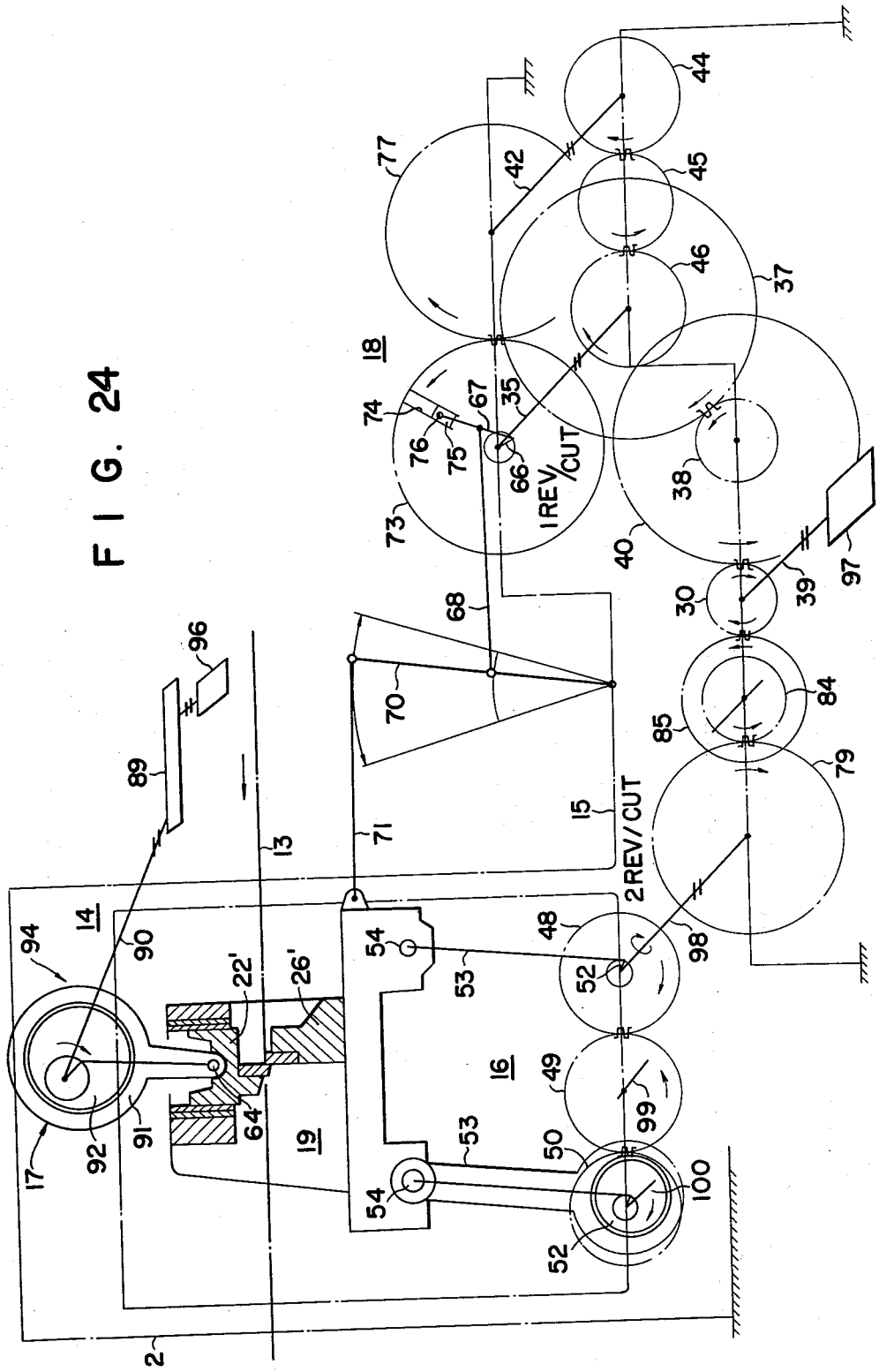
FIG. 24 is a schematic diagram showing the driving system of another embodiment of this invention.

One example of the shearing machine according to this invention in which the above object is achieved will now be described. Referring to FIG. 24, there is provided a housing 2 accommodating in the lower part thereof a pair of shifting supports 16 and in the upper part thereof a pair of shearing drives 17. A stock material is fed along a stock feeding line 13 passing horizontally through this housing 2. A pair of shifting drives 18 is disposed on the stock feeding side. A shiftable shear housing 19 is disposed within the housing 2 and is provided in vertically opposed positions with a liftable knife holder 22' and a stationary lower knife holder 26' and is supported by the pair of shifting supports 16 in a manner permitting it to be moved in reciprocating movement in the traveling direction of the stock by the pair of shifting drives 18. The liftable knife holder 22' is driven in vertical movement by the pair of shearing drives 17.

In the pair of shearing drives 17, an eccentric cam 92 is fixed to a main shaft 90 for shearing drive coupled through a gear reducer 89 to a shearing drive motor 96. A pitman 91 at its base end part is rotatably fitted around the outer periphery of the eccentric cam 92 and at the end of its arm is pivotally connected by a pin 64 to the liftable knife holder 22'. The shearing drive motor 96 is operated at times and with a frequency corresponding to the desired shearing length.

In the above mentioned pair of shifting supports 16, parallel shafts 98, 99, and 100 are rotatably supported on the base frame 15 of the housing 2. Circular eccentric cams 52, 52 of equal eccentricity (one eccentric cam 52 being represented by a straight line) and gears 48 and 50 of the same pitch diameter are fixedly supported respectively on the shafts 98 and 100. Around the outer peripheries of the eccentric cams 52, 52 are rotatably fitted the lower base and parts of straps 53, 53 of equal length (one strap 53 being represented by a straight line), the other or upper ends of these straps 53, 53 being connected by pivotal connections 54, 54 to the shiftable shear housing 19 in a manner such that the straps can swing parallelly thereby to constitute a parallel crank mechanism.

On one hand, the gears 48 and 50 are meshed with and thereby coupled by an idler gear 49 fixed to the shaft 99, and a gear 79 fixed to the shaft 98 is coupled by way of gears 84 and 85, a pinion 30a, and a pinion shaft 30 to which the pinion 30a is fixed, to the output shaft of a shifting drive motor 97 of the pair of shifting drives 18. In this manner, the eccentric cams 52, 52 are driven in the same direction through the same rotational angle at a twice the speed of the main shaft 35 for shifting drive.

In the above mentioned pair of shifting drives 18, a circular inner eccentric cam 66 (represented by a straight line in FIG. 24) is fixed at a suitable position on the main shaft 35 for shifting drive driven by the shifting drive motor 97 through the pinion shaft 30, the pinion 30a, and gears 40, 38, and 37. Around the outer periphery of this inner eccentric cam 66 is rotatably fitted a circular outer eccentric cam 67 (represented by a straight line in FIG. 24), and ground the outer periphery of this outer eccentric cam 67 is rotatably fitted the base end part of a strap 68 (represented by a straight line in FIG. 24). The other end of this strap 68 is pivotally connected to an intermediate part of a swinging lever 70 pivotally supported at its lower end by the base 15 and pivotally connected at its upper end to one end of a connecting rod 71 which is pivotally connected at its other end to the front part (or upstream part in relation to the travel direction of the stcok) of the shiftable shear housing 19.

The outer eccentric cam 67 is connected by a crank pin 76 to a sliding block 75 slidably fitted in a radial slot 74 provided in one side face of a gear 73 which is rotatably fitted on the main shaft 35 for shifting drive. The gear 73 is meshed with a gear 77 fixed to a driving shaft 42 to which is fixed a gear 44 which is coupled by way of an idler gear 45 to a gear 46 fixed to the main shaft 35 for shifting drive. The inner and outer eccentric cams 66 and 67 are thus driven in mutually opposite directions at the same rotational speed, and the resultant combined movement drives the shiftable shear housing 19 in one forward-return reciprocating movement for every revolution of the inner and outer eccentric cams 66 and 67. In each of the forward and return strokes, one constant-speed interval is produced, and, at the same time, the speed of the shiftable shear housing 19 in the constant-speed interval of the forward stroke is synchronized with the traveling speed of the stock.

During the reciprocating movement of the shiftable shear housing 19 due to the pair of shifting drives 18, the eccentric cams 52, 52 of the pair of shifting supports 16, which move interrelatedly with the pair of shifting drives 18, are driven clockwise at a rate of 2 revolutions per cut when the stock is traveling toward the left as viewed in FIG. 24, that is, at twice the rotational speed of the main shaft 35 for shifting drive (rotating clockwise). As a result, the shiftable shear housing 19 undergoes a straight-line approximating movement as indicated by points 1, 2, ... 22, 23 in the middle part of FIG. 16, in which the path of the movement is closest to a straight line in the shearing interval of points 21-22-23-0-1-2-3. In this shearing interval, the so-called flying shearing operation comprising contacting of the upper and lower shear blades against the traveling stock, shearing of the stock by the shear blades, and separation of the shear blades from the stock is carried out.

Figure 25:
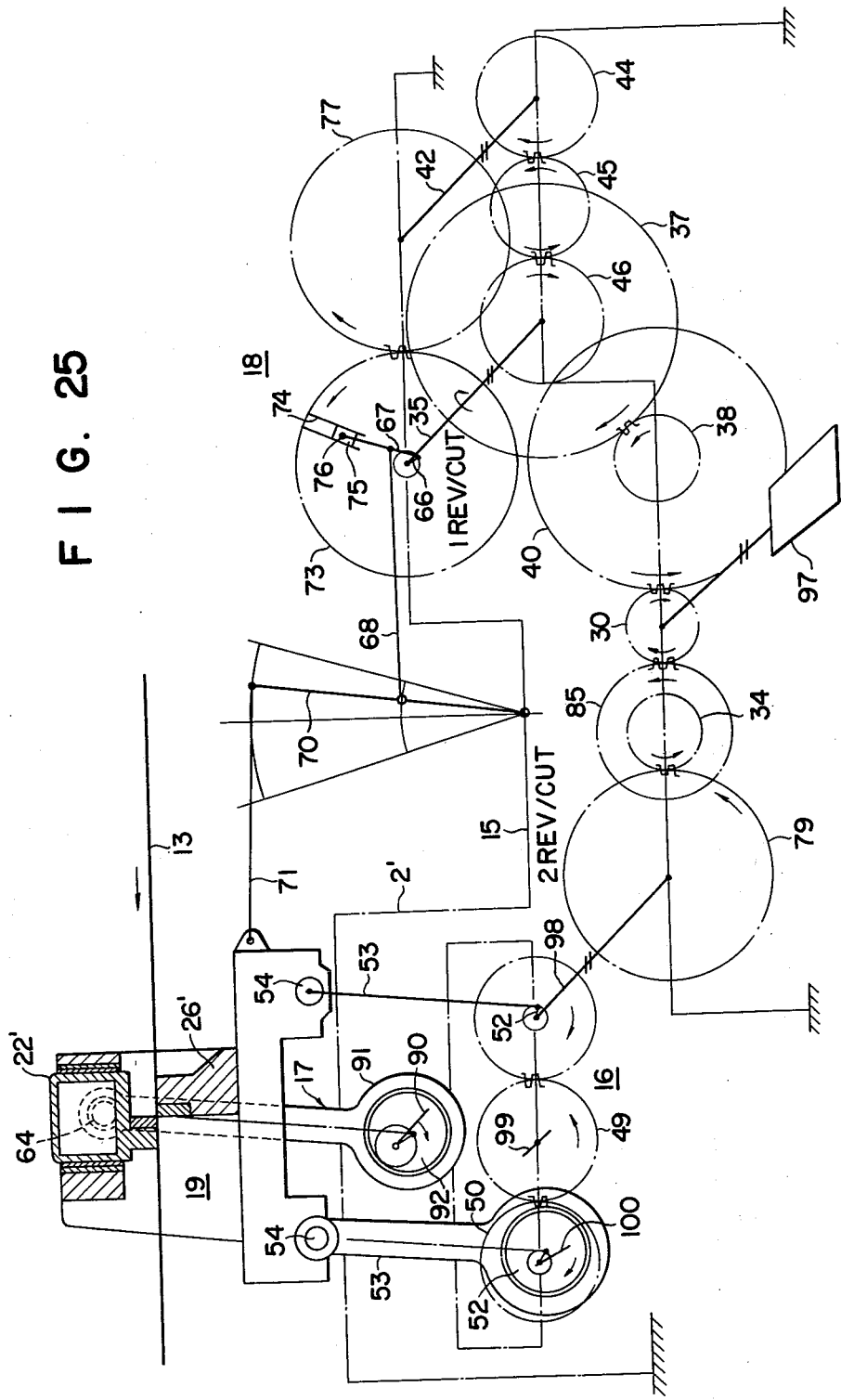
FIG. 25 is a schematic diagram showing the driving system of a modification of the flying shear machine illustrated in FIG. 24.

A modification as illustrated in FIG. 25 differs from the example of the flying shear machine shown in FIG. 24 only in that the pair of shearing drives 17 is disposed within a housing 2' positioned below the shiftable shear housing 19. The shiftable shear housing 19 in this modification undergoes a straight-line approximating movement as indicated in the middle part of FIG. 16 similarly as the shiftable shear housing of the flying shear machine shown in FIG. 24.

Figure 26:
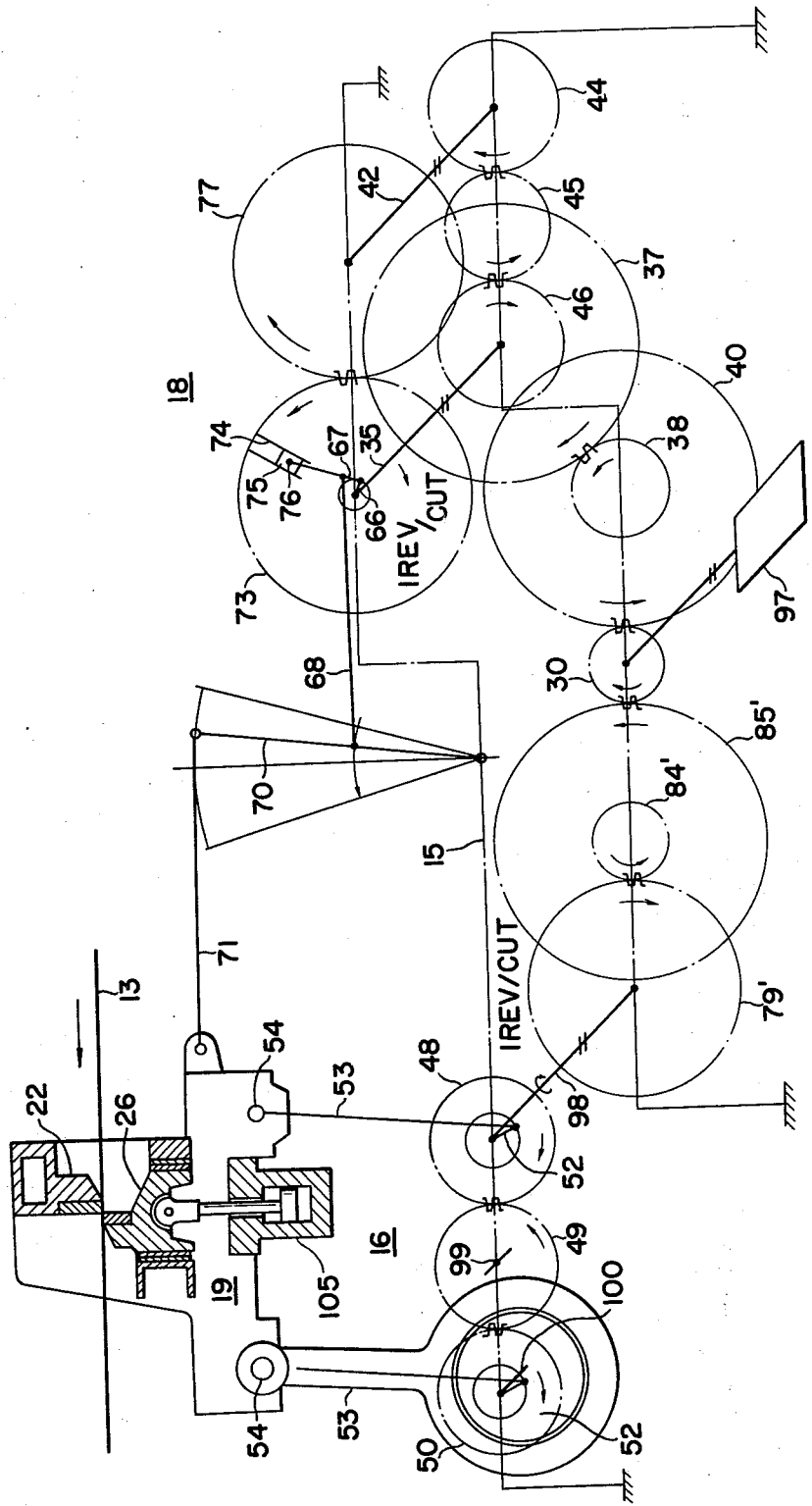
FIG. 26 is a schematic diagram showing the driving system of a modification of the flying shear machine illustrated in FIG. 25.

A modification, as illustrated in FIG. 26, of the example shown in FIG. 25 differs from the example of FIG. 25 in that the upper and lower knife holders 22 and 26 of the shiftable shear housing 19 are respectively of the stationary and liftable types, the liftable lower knife holder 26 being driven by a hydraulic cylinder 105 fixed to the lower part of the shiftable shear housing 19, and, at the same time, the eccentric cams 52, 52 of the pair of shifting supports 16 are adapted to rotate at the same rotational speed as the main shaft 35 for shifting drive.

When the stock is traveling toward the left as viewed in FIG. 26 in this example, the eccentric cams 52, 52 of the pair of shifting supports 16 are driven by the motor 97 of the pair of shifting drives 18 to rotate clockwise interrelatedly with the main shaft 35 for shifting drive through one revolution per cut, that is, in the same direction and at the same rotating speed as the main shaft 35. As a result, the shiftable shear housing 19 undergoes a movement as indicated by points 0, 1, 2, ... 22, 23 in FIG. 15, in which the path approximates a straight line in the forward stroke of points 19, 20, 21 ... 4, 5 and is closest to a straight line in the shearing interval of points 21-22 ... 2-3.

Figure 27:
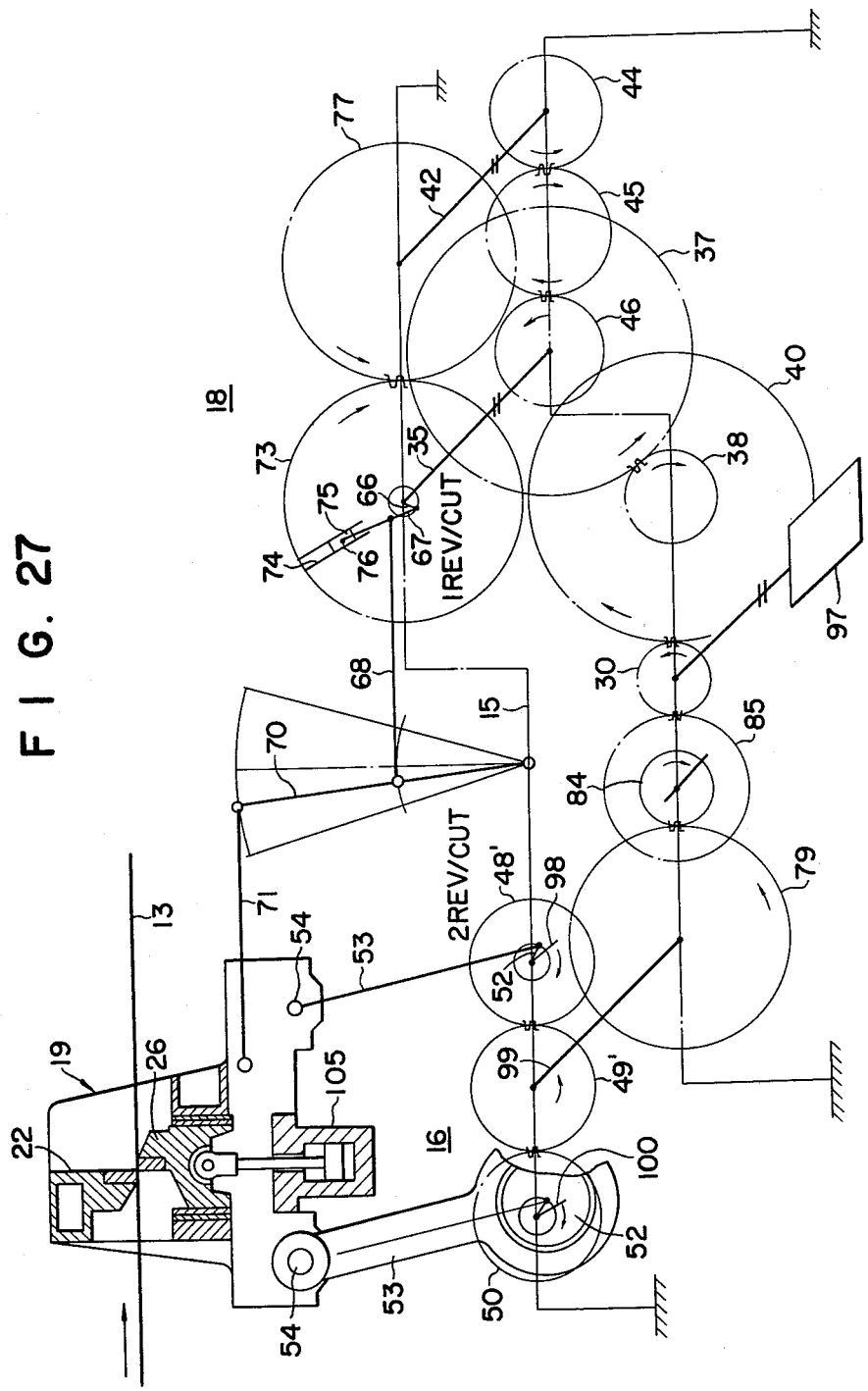
FIG. 27 is a schematic diagram showing the driving system of a modification of the flying shear machine illustrated in FIG. 26.

In FIG. 27 is shown a modification of the flying shear machine illustrated in FIG. 26. This modification differs from the example shown in FIG. 26 in that the ratio of the rotational speeds of the eccentric cams 52, 52 and the main shaft 35 for shifting drive is increased to 2:1, and, as the stock travels toward the right as viewed in FIG. 27, the rotational direction of the main shaft 35 for shifting drive is counterclockwise. In coincidence with the travel direction of the stock in FIG. 17, the shiftable shear housing 19 undergoes a movement approximating a straight-line movement as indicated by points 0, 1, 2, ... 22, 23 in the upper part of FIG. 17, and a movement most closely approaching a straight line is attained in the shearing interval of points 21-22 ... 2-3.

Figure 28:
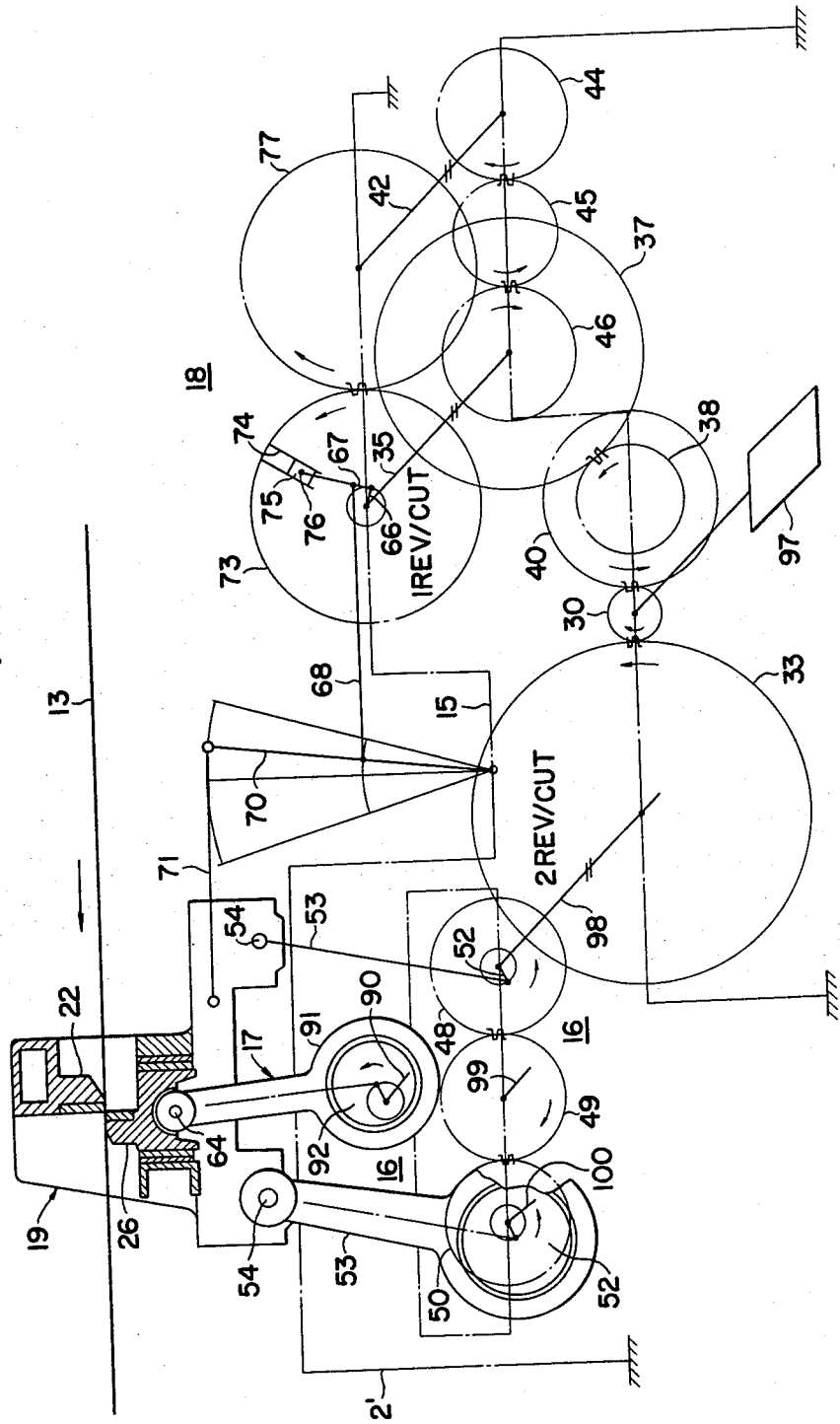
FIG. 28 is a schematic diagram showing the driving system of a modification of the flying shear machine illustrated in FIG. 27.

A modification of the flying shear machine illustrated in FIG. 27 is shown in FIG. 28. This modification differs from the machine shown in FIG. 27 in that the eccentric cams 52, 52 and the main shaft 35 for shifting drive are respectively rotated in the counterclockwise and clockwise directions as the stock travels toward the left in FIG. 28, and, moreover, crank mechanisms are used for the pair of shearing drives 17. The shiftable shear housing 19 undergoes a straight-line approximating movement as indicated by points 0, 1, 2, ... 22, 23 in the upper part of FIG. 17, a movement most closely approaching a straight line being attained in the shearing interval of points 21-22 ... 2-3.

In the embodiments of this invention illustrated in FIGS. 24 through 27, the pair of shifting supports 16 is driven by the motor 97 of the pair of shifting drives 18, thereby being caused to be synchronized with the pair of shifting drives 18. Next, an example wherein the pair of shifting supports 16 are driven by the motor 96 of the pair of shearing drives 17 and thus synchronized with the pair of shearing drives will be described.

Figure 29:
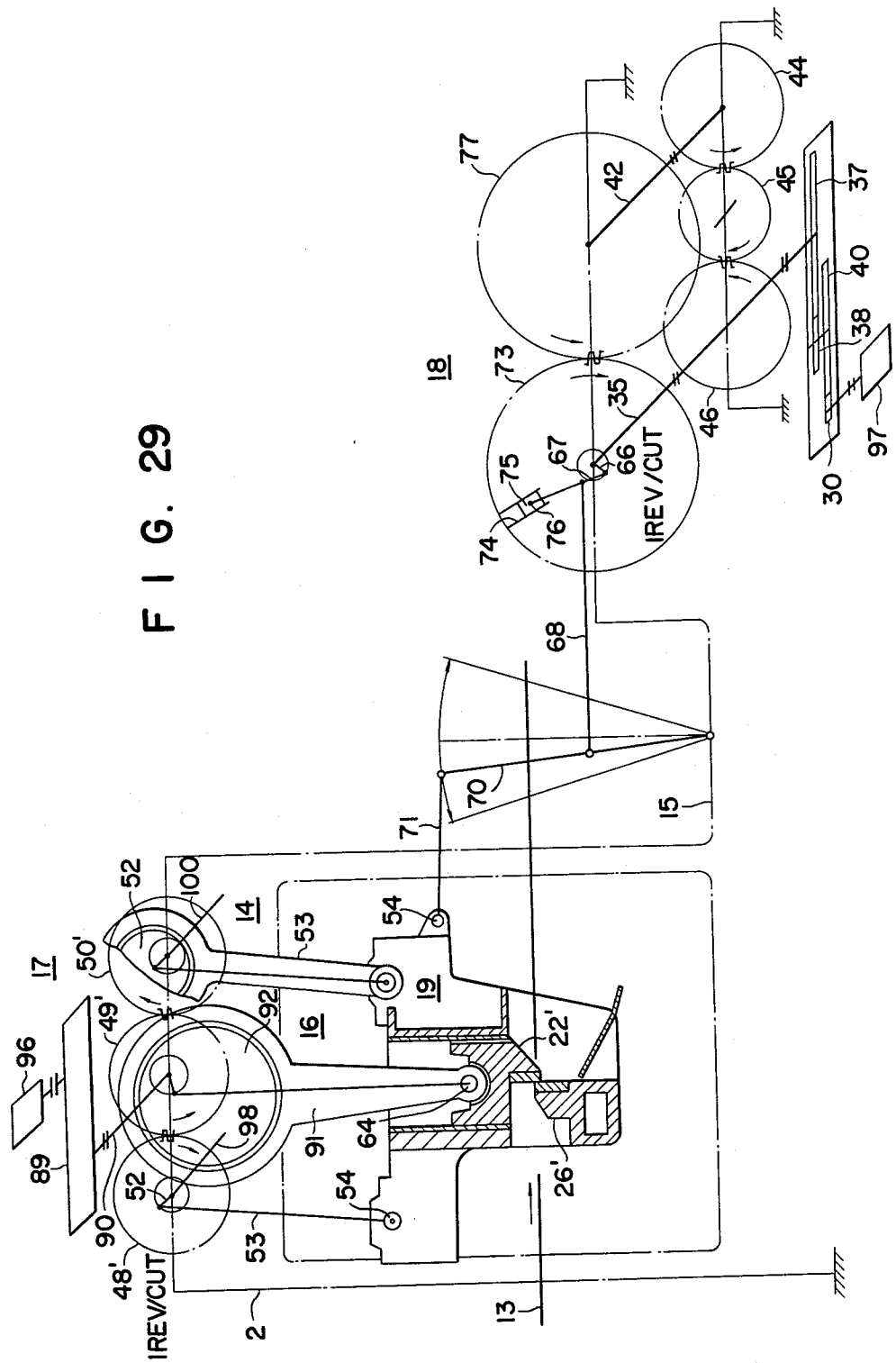
FIGS. 29 and 30 are schematic diagrams respectively showing the driving systems of flying shear machines illustrated in FIGS. 24 through 28 in which the pair of shifting supports and the pair of shifting drives are coupled with a common driving motor.

In the arrangement of the flying shear machine shown in FIG. 29, the pair of shifting supports 16 and the pair of shearing drives 17 are separated from a pair of shifting drives 18 of the same construction as that shown in FIG. 24 and mounted on the top beam 14 of the housing 2. The pair of shifting supports 16 are also driven by the main shaft 90 for shearing drive which is coupled by way of a gear reducer 89 to the motor 96. A gear 49' is fixed to this main shaft 90 for shearing drive and is meshed on opposite sides thereof with gears 48' and 50' of the same pitch diameter fixed to parallel shafts 98 and 100. Eccentric cams 52, 52 (one of which is represented by a straight line) of equal eccentricity are fixed with mutually the same angular phase on these shafts 98 and 100.

The upper or base end parts of straps 53, 53 (one of which is represent by a straight line) of equal length are fitted around the outer periphery of these eccentric cams 52, 52, and the other ends of the straps 53, 53 are pin connected by pins 54, 54 to the shiftable shear housing 19 in a manner such that the straps can swing in mutual parallel relationship, thereby suspending the shiftable shear housing 19. In the pair of shearing drives 17, an eccentric cam 92 is fixed to the main shaft 90 for shearing drive, and around the outer periphery of this eccentric cam 92, the upper or base end part of a pitman 91 is fitted, and the other end of this pitman 91 is pivotally connected by a pin 64 to a liftable knife holder 22' of the shiftable shear housing 19.

In the instant example, the motor 96 of the pair of shearing drives 17 is operated in synchronism with the motor 97 of the pair of shifting drives 18, and the main shaft 90 for shearing drive is rotated in the same direction (counter-clockwise) and at the same rotational speed as the main shaft 35 for shifting drive. Consequently, the eccentric cams 52, 52 driven by the main shaft 90 for shearing drive through the gears 49', 50', and 48' are driven in the direction (clockwise) opposite to that of the main shaft 35 for shifting dirve and at the same rotational speed, that is, one revolution per cut, when the stock is traveling toward the right in FIG. 29. The shiftable shear housing 19 undergoes a movement which, when the stock advance direction is made the same in FIG. 15, and the up and down directions are viewed in reverse, is as indicated by points 0, 1, 2, ... 22, 23 in the middle part of FIG. 15, in which a straight-line approximating movement is a attained, and a movement closest to a straight line is obtained in the shearing interval of points 21-22 ... 2-3.

Figure 30:
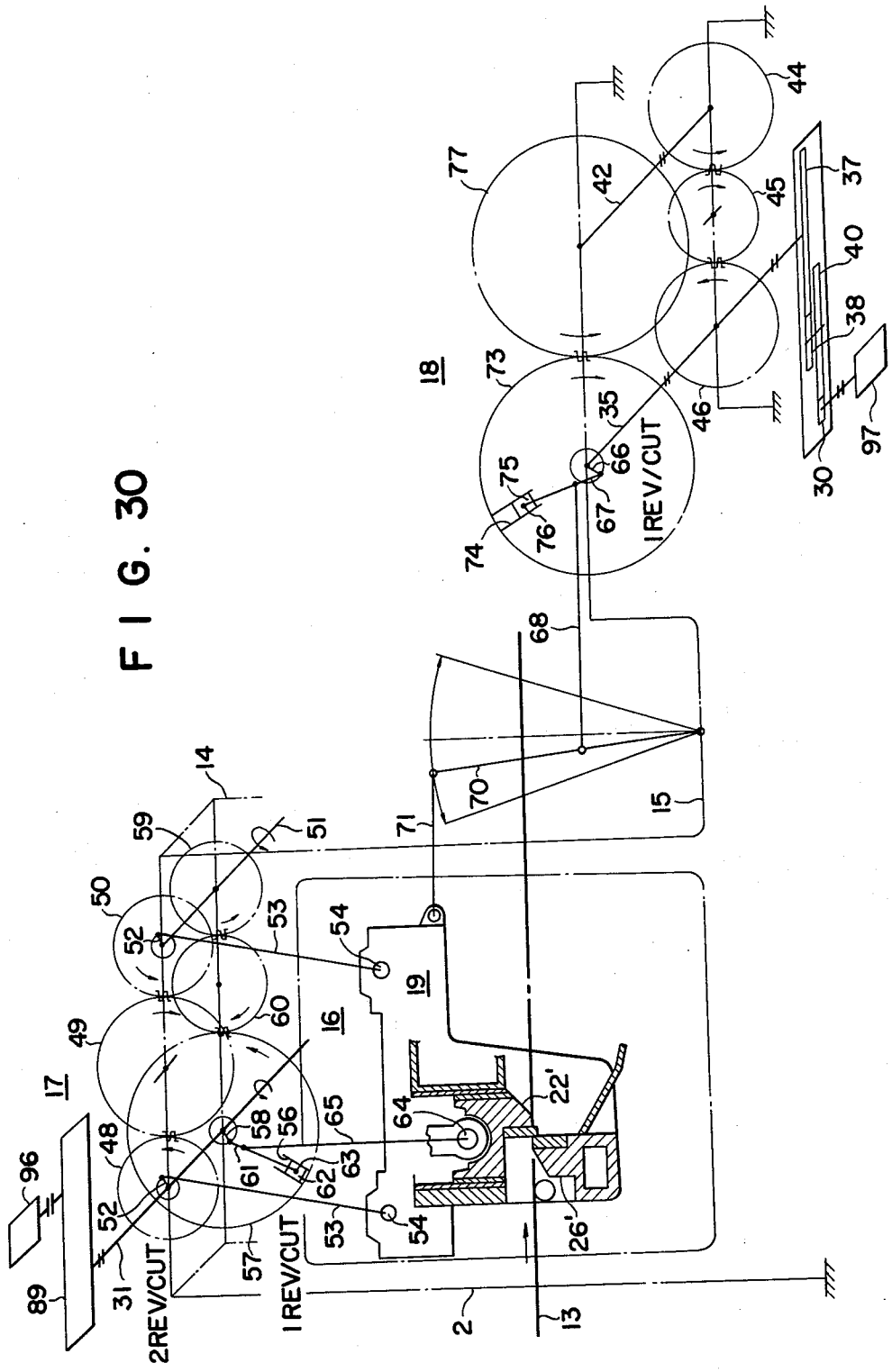

The example illustrated in FIG. 30 is of a construction wherein, in contrast to that illustrated in FIG. 29 in which, in the pair of shearing drives 17, the pitman 91 is fitted directly onto and around outer periphery of the eccentric cam 92 fixed to the main shaft 90 for shearing drive, a circular inner eccentric cam 58 (represented by straight line in FIG. 30) is fixed to the main shaft 31 for shearing drive and is fitted in a circular outer eccentric cam 61 (represented by a straight line in FIG. 30), and around the outer periphery of this outer eccentric cam 61, the base or upper end part of a strap 65 (represented by a straight line in FIG. 30) is fitted, the other end of this strap 65 being pin connected by a pina 64 to the liftable knife holder 22' of the shiftable shear housing 19, whereby the strap 65 is pivotally supported and can swing about the pin 65. The outer eccentric cam 61 is coupled by a pin 63 to sliding block 62 slidably fitted in and engaged with a radial slot 56 formed on one side face of a gear 57 rotatably fitted on the main shaft 31 for shearing drive and coupled by way of gears 60 and 59, a shaft 51, and gears 50 and 49 to a gear 48 fixed to the main shaft 31.

In the pair of shifting supports 16, circular eccentric cams 52, 52 (represented by straight lines in FIG. 30) of equal eccentricity are fixed with mutually the same angular phase respectively on the main shaft 31 for shearing drive and the shaft 51 to which the gears 50 and 59 are fixed. The upper or base end parts of straps 53, 53 (represented by straight lines in FIG. 30) of equal length are respectively fitted around the outer peripheries of these eccentric cams 52, 52. The other ends of the straps 53, 53 are pivotally connected by pins 54 to the shiftable shear housing 19 in a manner such that the straps 53, 53 can swing in mutually parallel relation. The pair of shifting drives 18, similarly as in the example illustrated in FIG. 29, has the same construction as the pair of shifting drives as those shown in FIG. 24, being installed separately from the pair of shifting supports 16 and the pair of shearing drives 17.

In the instant example, the main shaft 31 for shearing drive is driven at a rate of two revolutions per cut, that is, at twice the rotational speed of the main shaft 35 for shifting drive, in the same direction (counterclockwise) as the main shaft 35. The gear ratios are so selected that the gear 57 will be driven at half the rotational speed of the main shaft 31 for shearing drive, that is, at a rate of one revolution per cut. Consequently, the liftable knife holder 22' is driven by the resultant combined movement due to the inner eccentric cam 58 rotating through two revolutions per cut and the outer eccentric cam 61 rotating through one revolution per cut in the same direction as the inner eccentric cam 58. Also, circular eccentric cams 52, 52 of the pair of shifting supports are driven at a rate of two revolutions per cut in the same direction (counterclockwise) as the main shaft 35. Then, when the rotations of the motor 97 of the pair of shifting drives 18 and the motor 96 of the pair of shearing drives 17 are synchronized, the shiftable shear housing 19 undergoes a movement which, when the stock advance direction is made the same in FIG. 17, and the up and down directions are viewed in reverse, approximate a straight-line motion as indicated by points 0, 1, ... 22, 23 in the upper part of FIG. 17, a movement closest to a straight line being obtainable in the shearing interval of points 21-22 ... 2-3.

In accordance with this invention as described above, a parallel crank mechanism is employed for the pair of shifting supports, and by means of this parallel crank, a straight-line approximating movement is imparted to the shiftable shear housing at least during the shearing interval. The flying shear machine of this invention is thus applicable to the flying shearing of heavy-gage plates exceeding thicknesses of 6 or 9 mm. Which require a relatively long speed synchronizing interval. The shearing into sections of the stock is accomplished by the ascending and descending motion of a shear blade imparted thereto by a pair of shearing drives. Then, since eccentric cams rotatably fitted around eccentric cam drive shafts and straps of the above mentioned parallel crank mechanism rotate one or more revolutions and, at the same time, can be made with ample dimensions, the mechanism can be applied to high-speed, heavy-load flying shear machines without occurrence of problems relating to lubrication of the bearings of the shafts.

Furthermore, since the above mentioned parallel crank mechanism requires only a small installation area as characteristically indicated in FIG. 30, the motive power transmission mechanisms of this parallel crank mechanism and of the pair of shifting drives or of the pair of shearing drives can be combined, whereby the power transmission mechanism can be simplified. Still another feature of this invention is that, as shown in FIGS. 29 and 30, the directions of the reactive forces applied to the strap for raising and lowering the knife holder and the straps for shifting support are caused to be opposite thereby to mutually nullify the reactive forces. As a result, the weight of the housing can be reduced.

A further feature of this invention that, by appropriately selecting quantities such as the ratio of the rotational speeds of the cranks of the above mentioned parallel crank mechanism and the main shaft for shifting drive of the pair of shifting drives, the movement of the shiftable shear housing in the up-and-down direction can be minimized thereby to reduce the vibration load in the up-and-down direction applied as a result of the inertial mass of the shiftable shear housing to the shear machine base and the vibration damage caused thereby. Furthermore, a forward stroke which is a substantially ideal, straight-line approximating movement and a return stroke along an ideally peaked curve such as that required in hot shearing can be selectively obtained.

The shearing drive device can be a crank mechanism of the simple type or of the compound type, a known reciprocating actuating device such as a hydraulic cylinder can be selected at will. For this reason a flying shear machine optinally adapted to the purposes of use and the required performance can be realized.

In each of the embodiments of the invention described above and illustrated in FIGS. 3 through 14 and FIGS. 24 through 30, the shiftable shear housing is supported by a parallel crank mechanism. The shearing mechanism comprising inner and outer eccentric cams of this invention can be effectively employed in a known flying shear machine such as, for example, that illustrated in FIG. 2. An example of this will now be described with reference to figures.

Figure 35A:
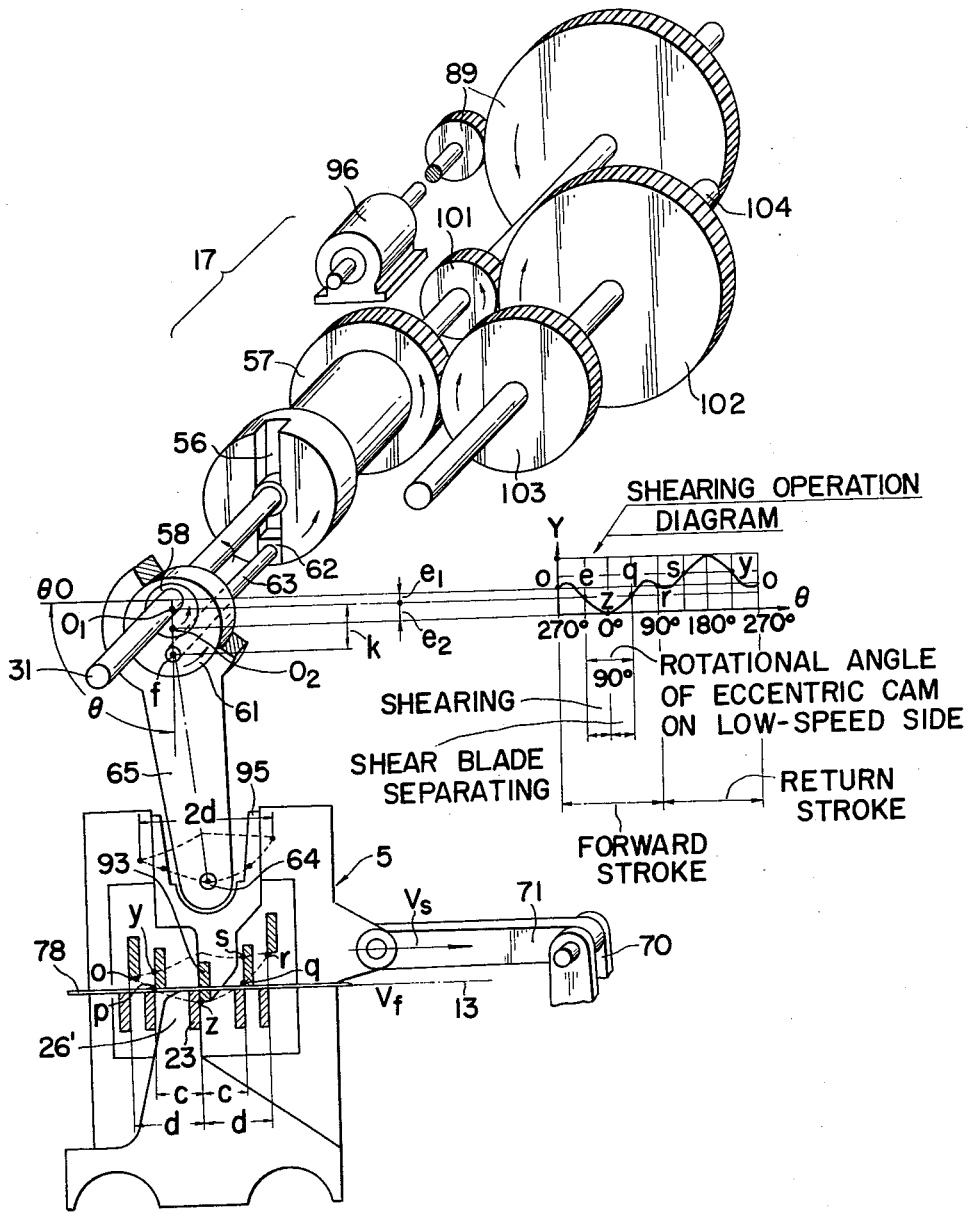

Referring to FIGS. 34 and 35, a housing 2 is installed on a stock feeding line 13 and contains a shiftable shear housing 5 having an upper knife holder 95 which has an upper shear blades 93 imbeddedly fixed thereto and is supported to be movable in the vertical direction and a lower knife holder 26' which has a lower shear blade 23 imbeddedly fixed thereto and confronting the upper shear blade 93, and which is fixed to the shiftable shear housing. The shiftable shear housing 5 is supported in a manner permitting its reciprocation parallelly to the traveling direction of the stock 78 by a plurality of support members 4 disposed on a lower beam of the housing 2.

The shifting drive device 18 is driven by a motor 97 and has an output shaft 35 supporting inner and outer eccentric cams 66 and 67 driven in mutually opposite directions but at the same rotational speed, and the resultant combined motion due to the rotation fo these eccentric cams is transmitted by way of a strap 68, a pendulum lever 70, and a connecting rod 71 to the shiftable shear housing 5. In this transmission of mechanical power, the shiftable shear housing is moved through one cycle of reciprocation (forward and return) for every revolution of the inner and outer eccentric cams 66 and 67, and a constant-speed interval is imparted in each of the forward and return strokes.

While the above described construction is substantially the same as that shown in FIG. 2 as one example of a known machine, in the instant embodiment of this invention, the shearing drive device 17 is installed on the top beam 14 of the housing 2 and has a construction as shown in FIG. 35. More specifically, to the main shaft 31 for shearing drive coupled by way of a gear reducer 89 to the motor 96 are respectively fixed a gear 101 and a circular inner eccentric cam 58, around the outer periphery of which a circular outer eccentric cam 61 is fitted. Around the outer periphery of this outer eccentric cam 61 is fitted the upper base part of a strap 65 pivotally connected at its other lower end to the upper knife holder 95.

At the same time, a spool gear 57 having a radial slot 56 formed in one side face thereof is rotatably supported on the output shaft 31 and is meshed with a gear 103 fixed to a countershaft 104 parallel to the output shaft 31. Another gear 102 also fixed to the countershaft 104 is meshed with the above mentioned gear 101. A sliding block 62 slidably fitted in and engaged with the radial slot 56 is coupled by a crank pin 63 to the outer eccentric cam 61. The number of teeth of the gears 101, 57, 102, and 103 are so determined that the inner eccentric cam 58 and the other eccentric cam 61 rotate in the same rotation direction but at different rotational speed with a rotational speed ratio of, for example, 1:2 or 1:3. At the same time, the eccentric cam of lower speed is driven at the same time and at the same rotational speed as the output shaft 35 of the shifting drive device 18.

When the motor 97 of the shifting drive device 18 is operated in the flying shear machine of the above described construction according to this invention, the shiftable shear housing is caused by the resultant combined movement of the inner and outer eccentric cams 66 and 67 to undergo a reciprocating motion parallel to the stock 78. In the forward and return strokes of this reciprocation, constant-speed intervals $p$-$z$-$q$ and $y$-$s$, respectively, as indicated in FIG. 35 are obtained. Then, when this constant speed $V_s$ is synchronized with the traveling speed $V_f$ of the stock 78, and the outer eccentric cam 61 of the shearing drive device 17 is driven at the same time and the same rotational speed as the rotational angles $s$-$y$-$o$-$p$-$z$-$q$-$r$-$s$ indicated in the shearing operation diagram corresponding to the rotational angles $s$-$y$-$o$-$o$-$z$-$q$-$r$-$s$ of the output shaft 35 shown in the shifting speed diagram, the upper shear blade 93 traces a path which is the reverse in up-and-down directions of that indicated in FIGS. 20 and 22 or FIGS. 21 and 23 of $s$-$y$-$o$-$p$-$z$-$q$-$r$-$s$. Then, during the interval in which the shifting speed of the forward stroke of the shiftable shear housing 5 is synchronized with the traveling speed of the stock 78, shearing of the stock 78 is carried out by the upper and lower shear blades 23 and 93.

In the shearing operation diagram in FIG. 35, the up-and-down directions of FIG. 21 are reversed, and the rotational angle of eccentric cam on the low speed side is represented by the abscissa (horizontal axis). The path of the upper shear blade 93 equivalent that of FIG. 23 in which the up-and-down directions are reversed. Therefore, in the embodiment of the invention illustrated in FIGS. 34 and 35, the housing 2 and the shiftable shear housing 5 can be made to have a compact size of the same order as that shown in FIGS. 19 and 33, and, moreover, the required capacity of the motor of the shearing drive device is small, as will be apparent when compared with those of the examples illustrated in FIGS. 31 and 32, FIGS. 19 and 33, FIGS. 20 and 22, and FIGS. 21 and 23.

In this embodiment of the invention illustrated in FIGS. 34 and 35, furthermore, the outer eccentric cam 61 of the shearing drive device 17 is rotated at a lower speed than the inner eccentric cam 58, which lower speed is the same as that of the output shaft 35 of the shifting drive device 18, but the inner eccentric cam 58 can be conversely made the lower speed side and driven at the same speed as the output shaft 35. In this case, a diagram which is substantially the same as those of FIGS. 20 and 22 and FIGS. 21 and 23 with reversed up-and-down relations can be obtained.

In the instant embodiment of this invention as described above and illustrated in FIGS. 34 and 35, a crank mechanism having inner an outer eccentric cams rotating in unison in the same direction is used for the shearing drive device, and one eccentric cam of these inner and outer eccentric cams is driven at a slower speed than the other eccentric cam and, moreover, is driven at the same speed and at the same time as the output shaft of the shifting drive device. In this manner, the total stroke of the liftable knife holder and torque arm at the shearing time for realizing the effective shearing stroke are held at values substantially equivalent to or less than those indicated in FIGS. 19 and 33. Moreover, the motor acceleration time of the shearing drive device is increased up to the motor acceleration time of the shifting drive device. Accordingly, the capacity of the motor of the shearing drive device can be made less than that in the case indicated in FIGS. 19 and 33 without an enlargement of the size of the shiftable shear housing and the housing. Therefore, a compact and economical flying shear machine for high-speed, high-load use is realized.

In each of the above described embodiments of the invention, the shearing drive device is shown as being mounted on the upper beam of the housing as one example of arrangement, but this invention is not intended to be limited to such as arrangement, it being applicable also to a construction wherein the shearing drive device is mounted on the frame below the shiftable shear housing.

I claim:

1. In a flying shear apparatus for cutting a traveling stock, employing a shiftable shear housing having upper and lower knife holders in mutually opposed relation, one being stationary, the other being movable in a vertical direction, and supported by shifting support means enabling said shear housing to reciprocate in the traveling direction of said stock, shearing drive means for driving said movable knife holder in a reciprocal manner to cut said stock, and shifting drive means to drive the shiftable shear housing for reciprocation at a speed synchronized with the travel speed of the stock at the time of stock cutting, said shifting drive means defined by a driving main shaft rotating in a first direction, circular inner eccentric cam means affixed to said main shaft, circular outer eccentric cam means slidably fitted around said inner eccentric cam means and driven by drive shaft means in a second direction opposite to said first direction at the same rotational speed as said main shaft and said inner eccentric cam means, and a motion transmitting mechanism connected at one end to said shear housing and slidably fitted around said outer eccentric cam means at the other end, for transmitting driving motion from said shifting drive means to said shear housing, said apparatus including: said shifting support means having parallel shafts, circular eccentric cams affixed to said parallel shafts, a pair of straps forming a parallel crank mechanism pivotally connected at one end to said shear housing and slidably fitted at the other end around said eccentric cams, and being further defined by driving means, first transmission means coupling said driving means to said main shaft and said outer eccentric cam drive shaft, second transmission means coupling said driving means to said parallel shafts, said first and second transmission means being operable to cause said parallel shafts and thereby said eccentric cams to rotate two revolutions per revolution of said main shaft, whereby a movement approximating a straight-line motion along the travel direction of said stock is imparted to said shiftable shear housing in at least a shearing interval of the forward stroke during the reciprocal motion thereof.

2. An apparatus as claimed in claim 1, wherein: said first and second transmission means being operable to cause said parallel shafts and said eccentric cams to rotate in a direction opposite to the direction of rotation of said main shaft.

3. An apparatus as claimed in claim 1, wherein: said first and second transmission means cause said parallel shafts and therefore said eccentric cams to rotate in the same direction as the direction of rotation of said main shaft.

4. In a flying shear apparatus for cutting a traveling stock, employing a shiftable shear housing having upper and lower knife holders in mutually opposed relation, one being stationary, the other being movable in a vertical direction, and supported by shifting support means enabling said shear housing to reciprocate in the traveling direction of said stock, shearing drive means for driving said movable knife holder in reciprocal manner to cut said stock, and shifting drive means to drive the shiftable shear housing for reciprocation at a speed synchronized with the travel of speed of the stock at the time of stock cutting, said shifting drive means defined by a driving main shaft rotating in a first direction, circular inner eccentric cam means affixed to said main shaft, circular outer eccentric cam means slidably fitted around said inner eccentric means and driven by a drive shaft means in a second direction opposite to said first direction at the same rotational speed as said main shaft and said inner eccentric cam means, and a motion transmitting mechanism connected at one end to the shear housing and slidably fitted around said outer eccentric cam means at the other end for transmitting driving motion from said shifting device means to said shear housing, said apparatus including: said shifting support means having parallel shafts, circular eccentric cams affixed to said parallel shafts, a pair of straps forming a parallel crank mechanism pivotally connected at one end to said shear housing and slidably fitted at the other end around said eccentric cams, and being further defined by driving means, first transmission means coupling said driving means to said main shaft and said outer eccentric cam drive shaft, second transmission means coupling said driving means to said parallel shafts, said first and second transmission means being operable to cause said parallel shafts and therefore said eccentric cams to rotate one revolution per revolution of said main shaft, whereby a movement approximating a straight-line motion along the travel direction of said stock is imparted to said shiftable shear housing in at least a shearing interval of the forward stroke during the reciprocal motion thereof.

5. An apparatus as claimed in claim 4, wherein: said first and second transmission means cause said parallel shafts and therefore said eccentric cams to rotate in the same direction as the direction of rotation of said main shaft.

* * * * *